United States Patent [19]
Klima et al.

[11] Patent Number: 6,117,934
[45] Date of Patent: Sep. 12, 2000

[54] ALKYLPOLYGLYCOSIDE CONTAINING SURFACTANT BLENDS FOR EMULSION POLYMERIZATION

[75] Inventors: Rudolph Klima, Lansdale; Wallace H. Pippin, West Chester; Marcie Natale, Southampton; Thomas Hopkins, Chalfont, all of Pa.; Ching Feng, Boston, Mass.; Dieter Feustel, Monheim, Germany

[73] Assignee: Henkel Corporation, Gulph Mills, Pa.

[21] Appl. No.: 09/009,432

[22] Filed: Jan. 20, 1998

Related U.S. Application Data

[60] Provisional application No. 60/051,145, Jun. 27, 1997, provisional application No. 60/037,046, Feb. 3, 1997, and provisional application No. 60/069,803, Dec. 15, 1997.

[51] Int. Cl.⁷ ...................................................... C08F 2/30
[52] U.S. Cl. .......................... 524/504; 524/560; 524/563; 524/564; 524/527; 524/549; 510/535; 510/327; 526/318.42; 526/329; 526/330
[58] Field of Search ............................. 524/58, 524, 560, 524/563, 564, 527, 549; 510/535, 327; 526/318.42, 329.2, 330

[56] References Cited

U.S. PATENT DOCUMENTS

| | | | |
|---|---|---|---|
| 3,714,096 | 1/1973 | Biale | 260/29.4 |
| 3,839,318 | 10/1974 | Mansfield | 260/210 |
| 4,483,780 | 11/1984 | Llenado | 252/135 |
| 4,657,999 | 4/1987 | Hoefer et al. | 526/200 |
| 4,767,625 | 8/1988 | Mitsuno et al. | 424/95 |
| 5,073,591 | 12/1991 | Tsaur | 524/460 |
| 5,266,690 | 11/1993 | McCurry, Jr. et al. | 536/18.6 |
| 5,370,816 | 12/1994 | Baezer et al. | 252/132 |
| 5,449,763 | 9/1995 | Wulff et al. | 536/18.6 |
| 5,542,950 | 8/1996 | Cole et al. | 8/107 |
| 5,556,573 | 9/1996 | Weuthen et al. | 510/535 |

OTHER PUBLICATIONS

Chemical Distionary, Fifth edition. Grant D Hackh's. McGraw–Hill Book Company, pp. 178 and 564.

*Primary Examiner*—James J. Seidleck
*Assistant Examiner*—Olga Asinovsky
*Attorney, Agent, or Firm*—John E. Drach; Martin G. Meder; Henry E. Millson, Jr.

[57] ABSTRACT

The invention is a surfactant composition comprising about 20 weight % to about 76 weight % of a fatty alcohol ethoxylate having a degree of ethoxylation of at least 14, about 4 weight % to about 40 weight % alkylpolyglycoside, and about 20 weight % to about 60 weight % water, wherein said composition is a liquid at room temperature, free of gel or solid phase, lattices containing said surfactant composition and a process for making said lattices.

113 Claims, 9 Drawing Sheets

ALKYLPOLYGLYCOSIDE CONTAINING SURFACTANT BLENDS FOR EMULSION POLYMERIZATION

CROSS-REFERENCE TO RELATED APPLICATIONS

This application claims the benefit of U.S. Provisional applications Ser. No. 60/051,145, filed Jun. 27, 1997, Ser. No. 60/037,046, filed Feb. 3, 1997 and Ser. No. 60/069,803, filed Dec. 15, 1997.

BACKGROUND OF THE INVENTION

This invention relates to alkyl glycoside blends with alcohol ethoxylates and their use in the emulsion polymerization of unsaturated monomers.

There is a significant market for nonionic surfactants for emulsion polymerization (100 mm #/yr.). Their primary advantage over anionic surfactants is decreased water sensitivity in applications such as paint. Most of the DISPONILS (TM Henkel Corp., Ambler, Pa.), which are ethoxylated fatty alcohols, are solids in a significantly large temperature regime, making them difficult to use and limiting their active concentration range. The alkyl phenol ethoxylates (APEs) nonionic surfactants have come under environmental agency scrutiny as materials that induce physical and genetic defects in wildlife and as environmental estrogens. There is a growing trend to move away from APEs. However, since no government regulations are in place banning APEs, latex manufacturers require a cost effective nonionic to induce the environmentally desirable activity of switching away from the APEs.

Accordingly, in view of the many requirements which polymer dispersions now have to satisfy, there is a continuing need for new polymerization emulsifiers. In this connection, the emulsifier used in the emulsion polymerization process has a crucial effect not only on the beginning and the subsequent course of the polymerization reaction, but also on the mechanical and chemical stability of the finished polymer emulsions (dispersions) and of the final product. Thus, such properties of the emulsion and of the formulated product as, for example, frost stability and stability in storage depend crucially on the emulsifier.

SUMMARY OF THE INVENTION

The invention is a surfactant composition comprising about 20 weight % to about 76 weight % of a fatty alcohol ethoxylate (FAE) having a degree of ethoxylation of at least 14, about 4 weight % to about 40 weight % alkylpolyglycoside, and about 20 weight % to about 60 weight % water, wherein the weight % is of the total of the fatty alcohol ethoxylate plus alkylpolyglycoside plus water, wherein said composition is a liquid at room temperature, free of gel or solid phase, lattices containing said surfactant composition and a process for making said lattices. Note that the terms "lattices" and "latexes" are used interchangeably herein.

DETAILED DESCRIPTION OF THE INVENTION

Figure 1:
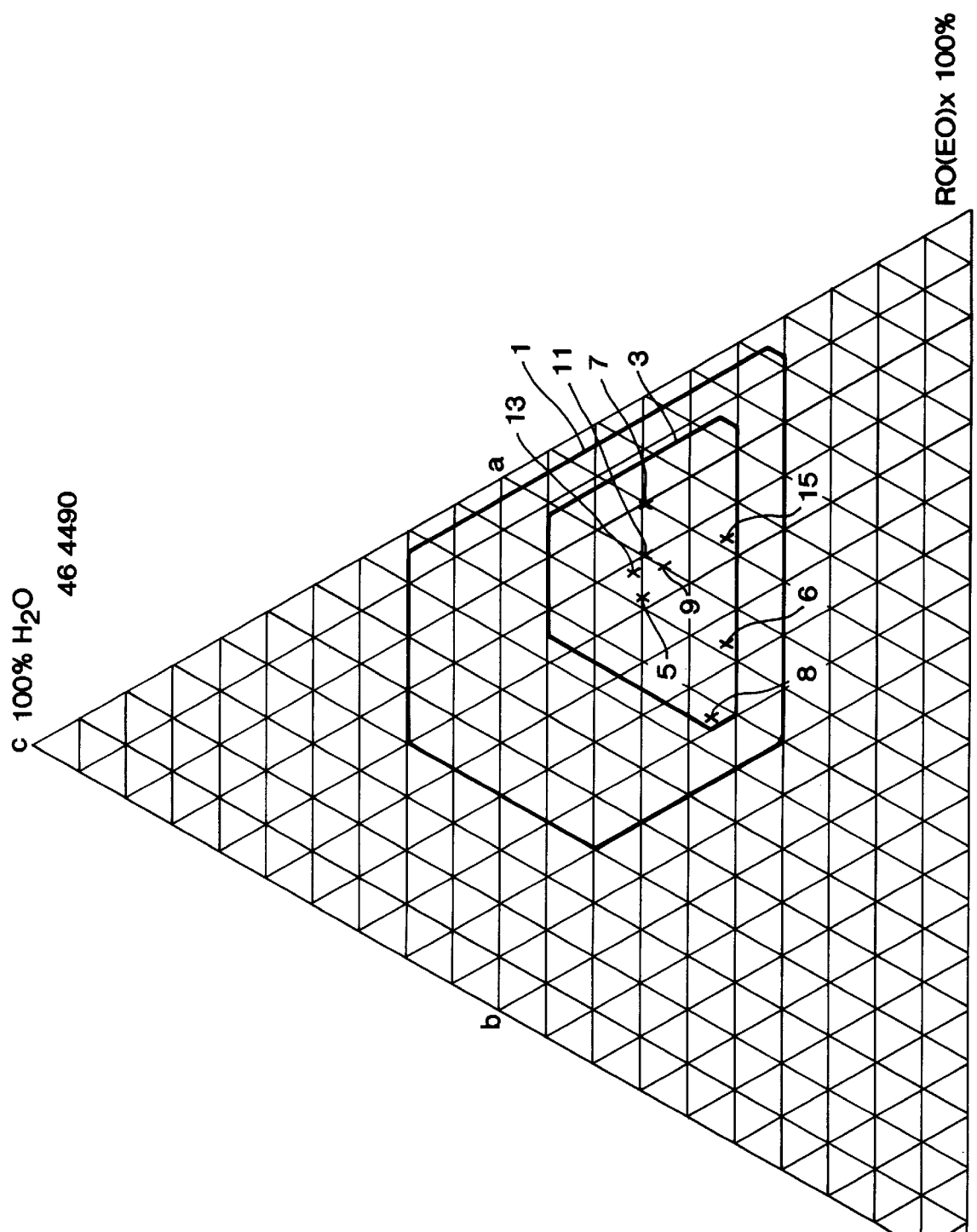
FIG. 1: Shows a ternary diagram of alkylpolysaccharide (APS)-FAE-water compositions.

It has been discovered that certain ternary mixtures of water-alkylpolysaccharides (APSs) such as alkylpolyglycosides-fatty alcohol ethoxylates (FAEs) are liquids at relatively high percent solids, despite the higher ethoxylated fatty alcohols of the invention being solids at room temperature. The liquid character of these surfactant blends makes them easy to meter, mix and dispense. Further, certain compositions exhibit no gel formation upon dilution into water, as they are commonly used when performing emulsion polymerizations. Also, latexes made with the mixtures of the present invention show low coagulum when using low levels of surfactant and excellent mechanical shear stability. Films produced by drying these latexes have desirably low water absorption.

Other than in the operating examples, or where otherwise indicated, all numbers expressing quantities of ingredients or reaction conditions used herein are to be understood as modified in all instances by the term "about". Also, all percentages are weight percentages unless indicated otherwise. First discussed will be the fatty alcohol ethoxylates, then the APSs, then the preferred blends of these surfactants, additional surfactants and other ingredients that may be incorporated into the APS/FAE blends or latexes containing them, and finally the use of the blends in emulsion polymerization of latexes.

The fatty alcohol ethoxylates. Suitable fatty alcohol ethoxylates are of the general formula, $RO(CH_2CH_2O)_nH$, or $RO(EO)_x$, or RO—X—EO where R is an alcohol and n and X are the moles of ethylene oxide units per mole of alcohol. The fatty alcohol residue may originate from any animal, natural or synthetic source. Note, however that it is desirable that the degree of ethoxylation of the fatty alcohol be greater than that normally encountered for detergent-type fatty alcohol ethoxylates. Specifically, it is preferred that the degree of ethoxylation be at least 14 and even more preferably at least 20 to 50. Suitable fatty alcohol ethoxylates include: tallow alcohol-40-ethoxylate, lauryl alcohol-30-ethoxylate, lauryl alcohol-20-ethoxylate, lauryl alcohol-50-ethoxylate, lauryl alcohol-40-ethoxylate, tallow-20-ethoxylate, tallow-30-ethoxylate, $C_{12}$–$C_{16}$-31EO, LAURYL-23EO, $C_{30}$-40EO, $C_{50}$-16EO. Suitable secondary alcohol ethoxylates include: $C_{11}$–$C_{15}$-15EO, $C_{11}$–$C_{15}$-20EO, $C_{11}C_{15}$-30EO, $C_{11}$–$C_{15}$-40EO. Suitable branched tridecyl alcohol ethoxylates include: $C_{13}$-14EO, $C_{13}$-15EO. Additional suitable alcohol ethoxylates include oleyl alcohol with 200 EO. The above mentioned nonionic surfactants are representative examples and are not meant to be an exhaustive list. A person skilled in the art will know that the mole ratio of the ethoxylate to the alcohol is an approximate ratio and not an absolute ratio.

The alkypolyglycosides. A goal of the present invention is to provide emulsifiers for emulsion polymerization which, on the one hand, show the favorable properties of alkyl glycosides, namely the fact that they can be produced from universally available, renewable natural raw materials and which, on the other hand, are at least equivalent in their technical properties to hitherto known nonionic emulsifiers, for example adducts of ethylene oxide with alkyl phenols, which are now believed to be environmental estrogens. Accordingly, the present invention relates to the use of alkyl glycosides of $C_8$–$C_{22}$ alkanols and reducing sugars, in which one sugar chain containing on average from 1 to 10 sugar residues attached to one another by glycoside bonds is present for every alkyl group, as co-emulsifiers in the emulsion polymerization of ethylenically unsaturated monomers.

The alkylpolyglycosides used in accordance with the invention can be produced, for example, by the process according to the above-mentioned U.S. Pat. No. 3,839,318. In that process, sugars such as, for example, glucose or oligosaccharides and alcohols having the required chain length, for example $C_6$–$C_{18}$, are reacted at 80° to 130° C. in the presence of an acidic catalyst, such as sulfuric acid, the water of reaction being separated off by vacuum distillation or by azeotropic distillation, and any change in the glucose being largely avoided by monitoring the reaction temperature and the catalyst concentration.

Suitable polymerization emulsifiers are alkyl glycosides wherein the alkyl group emanates from a $C_8$–$C_{22}$ alcohol and the sugar residue from a reducing sugar. The alkyl groups can be linear or branched and can contain an odd or even number of carbon atoms and, if desired, one or more olefinic double bonds.

The alkyl polyglycosides which can be used in the invention have the formula I

$$R_1O(R_2O)_b(Z)_a \qquad I$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, PLANTAREN® or AGRIMUL® surfactants from Henkel Corporation, Ambler, Pa., 19002. Examples of such surfactants include but are not limited to:

1. GLUCOPON® 220 Surfactant—an alkyl polyglycoside in which the alkyl group contains 8 to 10 carbon atoms and having an average degree of polymerization of 1.5.
2. GLUCOPON® 225 Surfactant—an alkyl polyglycoside in which the alkyl group contains 8 to 10 carbon atoms and having an average degree of polymerization of 1.7.
3. GLUCOPON® 600 Surfactant—an alkyl polyglycoside in which the alkyl groups contains 12 to 16 carbon atoms and having an average degree of polymerization of 1.4.
4. GLUCOPON® 625 Surfactant—an alkyl polyglycoside in which the alkyl groups contains 12 to 16 carbon atoms and having an average degree of polymerization of 1.4.
5. APG® 325 Surfactant—an alkyl polyglycoside in which the alkyl groups contains 9 to 11 carbon atoms and having an average degree of polymerization of 1.6.
6. PLANTAREN® 2000 Surfactant—an alkyl polyglycoside in which the alkyl group contains 8 to 16 carbon atoms and having an average degree of polymerization of 1.4.
7. PLANTAREN® 1300 Surfactant—an alkyl polyglycoside in which the alkyl groups contains 12 to 16 carbon atoms and having an average degree of polymerization of 1.6.
8. AGRIMUL® PG 2067 Surfactant—an alkyl polyglycoside in which the alkyl group contains 8 to 10 carbon atoms and having an average degree of polymerization of 1.7.

Other examples include alkyl polyglycoside surfactant compositions which are comprised of mixtures of compounds of formula I as described in U.S. Pat. Nos. 5,266,690 and 5,449,763, the entire contents of both of which are incorporated herein by reference.

According to the present invention, it is preferred to use alkyl glycosides of the type derived from fatty alcohols. Preferred alkyl glycosides are alkyl glycosides of fatty alcohol mixtures having a chain length of $C_8$, $C_{10}$, $C_{12}$, $C_{14}$, $C_{16}$ or $C_{18}$, the $C_{16}$ or $C_{18}$ groups optionally containing from 1 to 3 ethylenically unsaturated double bonds.

Insofar as the saccharide part of the alkyl glycosides is concerned, alkyl glycosides with a sugar chain containing on average from 1 to 10 sugar residues attached to one another by glycoside bonds are suitable. Although sugar residues of different reducing sugars can be used, glucose and maltose are preferred. The number of sugar residues is a statistical mean value on which the distribution typical of these products is based. Particularly suitable emulsifiers are alkyl glycosides containing on average from 1.4 to 5 sugar molecules per alkyl group and, more particularly, from 1.4 to 5 glucose molecules. Particularly preferred is that the average glycoside residue degree of polymerization of the at least one alkylpolyglycoside is about 1.4 to about 1.8.

Of these surfactants, alkyl glycosides having a C-chain length of from $C_8$ to $C_{14}$ are particularly preferred. Products such as these may be produced, for example, by reacting coconut oil fatty alcohol with glucose in accordance with Example 6 of the above-mentioned U.S. Pat. No. 3,839,318. Preferred 7221 alkylpolyglycosides are 220, GLUCOPON® 225 425, GLUCOPON® 600, and GLUCOPON® 625, all TM Henkel Corporation, Ambler, PA. The alkyl residue of the preferred alkylpolyglycoside, GLUCOPON® 220, is a mixture of $C_8$ to $C_{10}$, averaging 9 to 9.1 carbons in length, while the average glycoside residue degree of polymerization is 1.5. It is supplied as 60% solids in water. The GLUCOPON® 600 has an alkyl group of $C_{12}$ to $C_{16}$.

A word about nomenclature, as used herein "APS" means an "alkylpolysaccharide" such as alkylpolyglycoside, and "GLUCOPON® 220" is a 60% solution of a certain APS. However, to clarify the total amount of water in the composition, an artificial construct "APS 220," is used. "APS 220" is intended to denote a 100% active solids version of GLUCOPON® 220. In formulations where the % solids appear to be higher than that possible by using 60% solids APS, the formulations were concentrated by evaporation of the excess water and the formulation reported as though it had been made from 100% solids APS, the "APS 220."

The APS/FAE/water blends. The desirable ranges of ingredients of the surfactant blends are: 20 weight % to 76 weight % of a fatty alcohol ethoxylate, 4 weight % to 40 weight % alkylpolyglycoside, and 20 weight % to 60 weight % water, wherein the weight % is of the total of the fatty alcohol ethoxylate plus alkylpolyglycoside plus water, and wherein the weight percentages of said fatty alcohol ethoxylate plus alkylpolyglycoside plus water are controlled such that they total 100% for any composition, wherein said composition is a liquid at room temperature, free of gel or solid phase. These compositions are shown in FIG. 1 as region 1. Particularly preferred compositions comprise 39 to 67.5 weight % of a fatty alcohol ethoxylate, 5 to 35 weight % alkylpolyglycoside, and 22 weight % to 45 weight % water. These compositions are shown in FIG. 1 as region 3. Many of these compositions also have the desirable property of remaining gel-free upon dilution with water.

Specific compositions that fall into these areas are: 46 wt. % lauryl alcohol-30-ethoxylate, 19 wt. % of an alkylpolyglycoside having an alkyl group with an average carbon chain length of 9 and with an average glycoside residue degree of polymerization of about 1.5, and 35 wt. % water. This composition is at point 5 on FIG. 1.

46 wt. % tallow alcohol-40-ethoxylate, 28 wt. % of an alkylpolyglycoside having an alkyl group with an average carbon chain length of 9 and with an average glycoside residue degree of polymerization of 1.5, and 26 wt. % water. This composition is at point 6 on FIG. 1.

46 wt. % tallow alcohol-40-ethoxylate, 28 wt. % of an alkylpolyglycoside having an alkyl group with an average carbon chain length of 9 and with an average glycoside residue degree of polymerization of 1.5, and 26 wt. % water. This composition is at point 8 on FIG. 1.

46 wt. % lauryl alcohol-20-ethoxylate, 19 wt. % of an alkylpolyglycoside having an alkyl group with an average carbon chain length of 9 and with an average glycoside residue degree of polymerization of 1.5; and 35 wt. % water. This composition is at point 5 on FIG. 1.

46 wt. % lauryl alcohol-50-ethoxylate, 19 wt. % of an alkylpolyglycoside having an alkyl group with an average carbon chain length of 9 and with an average glycoside residue degree of polymerization of 1.5, and 35 wt. % water. This composition is also at point 5 on FIG. 1.

46wt. % lauryl alcohol-40-ethoxylate, 19 wt. % of an alkylpolyglycoside having an alkyl group with an average carbon chain length of 9 and with an average glycoside residue degree of polymerization of 1.5 and 35 wt. % water. This composition is also at point 5 on FIG. 1.

55 wt. % lauryl alcohol-30-ethoxylate, 10 wt. % of an alkylpolyglycoside having an alkyl group with an average carbon chain length of 9 and with an average glycoside residue degree of polymerization of 1.5, and 35 wt. % water. This composition is at point 7 on FIG. 1.

50.2 wt. % lauryl alcohol-20-ethoxylate, 16.8 wt. % of an alkylpolyglycoside having an alkyl group with an average carbon chain length of 9 and with an average glycoside residue degree of polymerization of 1.5, and 33 wt. % water. This composition is at point 9 on FIG. 1.

50 wt. % lauryl alcohol-20-ethoxylate, 15 wt. % of an alkylpolyglycoside having an alkyl group with an average carbon chain of 9 and with an average glycoside residue degree of polymerization of 1.5, and 35 wt. % water. This composition is at point 11 on FIG. 1.

48 wt. % lauryl alcohol-40-ethoxylate, 16 wt. % of an alkylpolyglycoside having an alkyl group with an average carbon chain of 9 and with an average glycoside residue degree of polymerization of 1.5, 36 wt. % water. This composition is at point 13 on FIG. 1.

55.5 wt. % lauryl alcohol-50-ethoxylate, and 18.5 wt. % of an alkylpolyglycoside having an alkyl group with an average carbon chain length of 9 and with an average glycoside residue degree of polymerization of 1.5, and 26 wt. % water. This composition is at point 15 on FIG. 1.

50 wt. % lauryl alcohol-30-ethoxylate, 15 wt. % of an alkylpolyglycoside having an alkyl group with an average carbon chain length of 9 and with an average glycoside residue degree of polymerization of 1.5, and 35 wt. % water. This composition is also at point 11 on FIG. 1.

The preferred technique for making these blends on a large scale to minimize intermediate gel formation is to heat the water above the cloud point of the surfactants, which will generally be at or near boiling, add the surfactants with stirring and cool while stirring.

Surfactant blends of DISPONIL LS20, LS30, LS40 and LS50 (lauryl alcohol ethoxylates) with APS 220 and 600 were made. APG Surfactants blends with DISPONIL TA 20, 30 and 430 (tallow alcohol 20, 30 and 40 ethoxylates, respectively) were also made. The phase diagrams of these systems were determined. Vinyl acetate/butyl acrylate latexes were made using these surfactants as well as Trycol® 6970 (APE) and DISPONIL 3065 and 4065 (APG Surfactants 110 containing blends).

It was found that the level of coagulum decreased by an order of magnitude for blends of APG® SURFACTANTS 220 and APG SURFACTANTS 600 with LS 30 and TA430, compared to latex synthesized using Trycol® 6970. The particle size distribution was comparable. The APG® SURFACTANTS 220 improved the phase behavior of the Disponils by increasing the temperature range over which a liquid blend could be maintained. This has significant implications for product quality, ease of manufacture, storage and product delivery.

Additional surfactants and other ingredients that may be incorporated into the APS/FAE blends or latexes containing them. The APS/FAE/water blends of the invention can be combined with anionic, cationic or other nonionic emulsifiers.

Suitable anionic emulsifiers are sulfocarboxylic acids, their alkyl esters, fatty alcohol (ether) sulfates, alkyl phenol (ether) sulfates, sulfosuccinic acid (semi)esters and/or soaps of natural or synthetic origin. Other suitable anionic emulsifiers are, for example, disproportionated resin soaps, water-soluble salts of branched chain monocarboxylic acids obtainable, for example by the products of the so-called Guerbet reaction, alkyl benzene sulfonates, paraffin sulfonates, alkyl naphthalene sulfonates, water-soluble salts of sulfated oils, alkyl ether phosphates, alkyl phenol ether phosphates, aminoalkanol sulfonic acids and/or alkyl diphenyl ether sulfonates.

According to the invention, the present APS/FAE/water blends can also be used together with cationic emulsifiers, for example with fatty amine hydrochlorides or quaternary ammonium compounds. Other emulsifiers which can be combined with the APS/FAE/water mixtures are additional nonionic emulsifiers, for example ethoxylates of alkyl phenols, fatty acid and fatty acid ester ethoxylates. In addition, APS/FAE/water blends can also be used in conjunction with mixed-ionic compounds, i.e. long-chain betaines or sulfobetaines. Where the alkyl glycosides of the invention are combined with other emulsifiers, it is preferred to use these other emulsifiers in quantities of from 10 to 80% by weight and preferably in quantities of from 20 to 50% by weight, based on the alkyl glycoside. One combination consists of sulfofatty acid esters, sulfofatty acids and the APS/FAE/water blends used in accordance with the invention.

To solve particular problems associated with emulsion polymerization, it may even be advisable to use APS/FAE/water blends together with protective colloids. In that case, however, it is important to ensure that, mechanistically, emulsion polymerization does in fact take place, i.e. that the polymerization reaction takes place in micelles, forming lattices having a smaller particle size than the starting dispersion.

Emulsion polymerization of latexes. In a first embodiment of the invention, the APS/FAE/water blends can be used in the emulsion polymerization of vinyl esters. Suitable vinyl esters are vinyl acetate, vinyl propionate, vinyl-2-hexyl hexanate and also higher esters of vinyl alcohol. The emulsifiers are also suitable for use in the polymerization of vinyl halides, preferably vinyl chloride or vinylidene chloride.

In another embodiment of the invention, the APS/FAE/water mixtures can be used, preferably in combination with anionic emulsifiers, in the emulsion polymerization of olefins. Suitable olefins are, for example, styrene or other aromatic vinyl compounds, such as a-methyl styrene or isobutene. The emulsifiers can also be used in the emulsion polymerization of diolefins, for example in the production of rubber lattices in the broadest sense, i.e. those based on butadiene, isoprene, chlorinated butadienes, chlorinated isoprenes or on copolymers of diolefins with styrene and/or acrylonitrile.

In another embodiment of the invention, the APS/FAE/water mixtures can be used, preferably in conjunction with anionic emulsifiers, in the emulsion polymerization of esters and/or amides of acrylic and/or methacrylic acid. Thus, the compounds can be used in the polymerization of the methyl, ethyl, propyl, isopropyl, butyl, hexyl and/or 2-ethylhexyl esters of acrylic acid and/or methacrylic acid. The emulsifiers can also be used in the emulsion polymerization of N-alkylamides of acrylic and/or methacrylic acid.

In another embodiment of the invention, the APS/FAE/water blends can be used, if desired, together with anionic emulsifiers, in the emulsion polymerization of vinyl esters. Suitable vinyl esters are vinyl acetate, vinyl propionate, vinyl-2-hexyl hexanate and also higher esters of vinyl alcohol. The emulsifiers are also suitable for use in the polymerization of vinyl halides, preferably vinyl chloride or vinylidene chloride.

The emulsifier mixtures can also be used in the copolymerization of at least one of the above-mentioned monomers with other, optionally partially water-soluble monomers. Thus, they are suitable for use in the copolymerization of ethylenically unsaturated monomers with acrylonitrile, methacrylonitrile, maleates or fumarates, for example di-n-butyl maleate or monobutyl maleate.

Finally, the APS/FAE/water emulsifier mixtures are also suitable for use in the emulsion polymerization of mixtures of different monomers, for example mixtures of acrylates with styrene, ethylene with vinyl acetate or vinyl chloride with vinyl acetate and mixtures of vinyl acetate with long-chain vinyl esters, for example versatic acid vinyl ester. Water-insoluble monomer is selected from the group consisting of vinyl acetate, butyl acrylate, styrene, butadiene, methylmethacrylate, methylacrylate, chloroprene, vinyl chloride, acrylonitrile, acrylamide, ethylene, ethyl acrylate, vinyl versatate, maleic anhydride 2-ethyl hexyl acrylate and mixtures thereof are particularly preferred.

Also within the scope of the invention, the emulsifiers are used in the copolymerization of ethylenically unsaturated, water-insoluble monomers with dissociable, water-soluble monomers, the dissociable, water-soluble monomers making up less than 40% by weight and preferably from 0.5 to 15% by weight of the monomer total.

Suitable water-soluble, dissociable monomers are acrylic acid, methacrylic acid, itaconic acid, maleic acid, fumaric acid, semiesters of maleic acid or fumaric acids, crotonic acid, vinyl sulfonic acid, vinyl phosphonic acid and/or 2-acrylamino-2-methylpropane sulfonic acid. The acids are preferably used in the form of salts, for example alkali metal salts or ammonium salts. Other suitable comonomers are basic esters of acrylic and/or methacrylic acid, for example dimethylaminoethyl methacrylate.

Where the APS/FAE/water blends are used in accordance with the invention, the preferred ratio of monomers to water is from 1:3 to 1:1 parts by weight. Standard auxiliaries may be used together with the emulsifiers in emulsion polymerization processes. Such auxiliaries include, for example, polymerization initiators and/or accelerators, such as for example potassium or ammonium persulfate, hydrogen peroxide, reducing agents, such as salts of sulfurous acid or of dithionic acid, transition metal compounds and the like. By virtue of the comparatively low stability of the alkyl glycosides at pH values above 7, it is preferred to use buffers, such as sodium hydrogen carbonate or sodium pyrophosphate, ammonium acetate or sodium acetate as further auxiliaries.

It is also possible to use molecular weight regulators such as, for example, organic sulfur compounds, including mercaptoethanol, thioglycolic acid or thioglycolic acid esters with polyhydric alcohols, such as ethylene glycol or glycerol.

With the emulsifiers suitable for use in accordance with the invention, the emulsion polymerization can be carried out at the usual temperatures, for example at temperatures in the range of from 0 to 120° C. and preferably at temperatures in the range of from 40 to 100° C. and under normal pressure or, in the case of gaseous monomers, even under elevated pressure. The various methods of addition known by those skilled in the art of polymerization can be used. Thus, an emulsion can be prepared in the reaction vessel and then polymerized or, if desired, the monomers, auxiliaries or even more emulsion can be added continuously or in batches during the reaction.

As shown in the following examples, which are not given for purposes of limitation, low-coagulate, stable dispersions are obtained by means of APS/FAE/water blends.

EXAMPLE 1

Vinyl acrylic latex was made using the following recipe.

TABLE 1

Vinyl Acrylic Latex Synthesis Recipe
Formulation sheet for Vinyl Acetate/Butyl Acrylate Latex

| | Weight (gm) |
|---|---|
| Premix of monomers | |
| Material | |
| Total weight monomers (gms) = | 270 |
| monomer 1 (Vinyl Acetate) = | 229.5 |
| monomer 2 (Butyl Acrylate) = | 40.5 |
| First Charge | |
| Water | 249.3 |
| Anionic (28% Avirol 2010 = | 4.82 |
| (TM Henkel, sodium lauryl sulfate) | |
| Nonionic (LS30/APS@65% solids) = | 6.23 |
| (LS30 = 30 mole ethoxylate lauryl alcohol) | |
| 55% LS30(6.23 × 0.55 = 3.45 g) | |
| 10% APS (6.23 × 0.10 = 0.63 g) | |
| 35% Water (6.23 × .35 = 2.15 g) | |
| Sodium Persulfate | 1.01 |
| Sodium Bicarbonate | 0.5 |
| $FeCl_3$(trace) | 0.01 |
| Adjust pH w 85% phos. acid | 3.5 |
| Sparge into liq with N2 until T = 55 C. | |
| Adjust heater | |
| Stir at 150 rpm | |
| Record Start Time | |
| Second Charge | |
| When T = 55 C. | |
| Add 10% of monomer mix | |
| with eye dropper | |
| Keep T < 60 C. | |
| Allow to mix about 5 min. | |
| Clean pump with isopropyl alcohol then water | |
| Third charge | |
| Make reducer: | |
| SFS (sodium formaldehyde sulfoxylate) | 0.5 |
| 30% $NH_4OH$ | 0.5 |
| Water | 50 |
| Add 1 ml by dropper | |
| Add to reactor via dropping | |
| funnel (slow drops) 12 drops/min | |
| Record time | |

TABLE 1-continued

Vinyl Acrylic Latex Synthesis Recipe
Formulation sheet for Vinyl Acetate/Butyl Acrylate Latex

| | Weight (gm) |
|---|---|
| Fourth charge | |
| Pump remaining monomer | |
| mix in @ 1 g/min(3 hrs) | |
| pump gauge = 40 | |
| Allow to mix 30 min after | |
| all monomer added while | |
| dropping SFS solution. | |
| Fifth charge | |
| Make TBHP (tributylhydroperoxide)solution: | |
| If 70% liquid dilute | |
| 1.4 gms TBHP to 100 gm | |
| otherwise if solid:THBP Solid | 1 |
| Water | 10 |
| Add few drops to flask | |
| Monitor temp | |
| If T increases run reaction 15 min | |
| Add again check T | |
| If T constant start cool down | |
| USE UP ALL MONOMER | |
| % Solids = | 49 |

The physical and application properties were tested for vinyl acrylic latexes containing LS30 and APS 220 at different weight percents and at a ratio of 3 to 1 relative to anionic surfactant. Other surfactants were then substituted for the LS30/APS 220 mixture. Latexes made with these surfactants were also tested. Comparing ABEX 2525 (TM Rhone Poulenc, Inc., Cranbury N.J., believed to be mixed linear and branched alcohol ethoxylates) at 1.5%, Trycol® 6970 (TM Henkel Corp., nonyl phenol 40-ethoxylate) at 1.5%, 3065 (TM Henkel as DISPONIL A 3065, mixed alcohol ethoxylates) at 1.5% and different ratios of APS 220 to LS 30, the coagulum is significantly reduced with the APS 220/LS 30 mixtures. The latex containing APS 220/LS30 at the same level as the nonyl phenol ethoxylate exhibits an 83% increase in shear stability. Latex containing the LS30/APS 220 mixture at the same concentration level, 1.5% as the ABEX, 3065 and Trycol® 6970 (nonyl phenol ethoxylate) exhibits equivalent water adsorption. However there is an optimum level of LS30/APS 220 that will give minimal water adsorption in this monomer system. Physical and application or film properties are summarized in Table 2.

TABLE 2

Physical and Film Properties

| Surfactant Level | pH | % SOLIDS | Particle Size nm | wt. % COAG | PENDULUM HARDNESS | SHEAR STABILITY, min. | $H_2O$ Ads. | MEK rub |
|---|---|---|---|---|---|---|---|---|
| APS220/LS30 1.5 | 4.2 | 47.68 | 174.6 | 0.17 | 53.00 | 0.33 | 0.0022 | 96.15 |
| APS220/LS30 2.0 | 4.2 | 47.82 | 164.5 | 0.19 | 50.00 | 0.25 | 0.0004 | 98.17 |
| APS220/LS30 3.0 | 4.9 | 47.32 | 185 | 0.10 | 60.33 | 1.00 | 0.0042 | 99.33 |
| APS220/LS30 4.0 | 5.0 | 48.49 | 174.4 | 0.68 | 46.33 | 0.33 | 0.0034 | 97.98 |
| ABEX 2525 1.5 | 3.8 | 47.49 | 172.9 | 0.25 | 72.33 | 0.33 | 0.0020 | 99.90 |
| Trycol 6970 1.5 | 4.8 | 47.93 | 156.9 | 0.40 | 69.33 | 0.18 | 0.0029 | 99.89 |

TABLE 2-continued

Physical and Film Properties

| Surfactant Level | pH | % SOLIDS | Particle Size nm | wt. % COAG | PENDULUM HARDNESS | SHEAR STABILITY, min. | $H_2O$ Ads. | MEK rub |
|---|---|---|---|---|---|---|---|---|
| DISPONIL 3065 1.5 | 4.7 | 48.10 | 188.6 | 0.34 | 74.33 | 0.18 | 0.0015 | 99.68 |

Surfactant level is weight % based on monomer (BOM)
$H_2O$ Ads. is % change in film weight after immersion in water

EXAMPLE 2

Vinyl Acrylic with Maleic Anhydride: The same redox procedure was used as in Example 1 with the following exceptions: The vinyl acetate was 85 wt. %, butyl acrylate was 15 wt. % and maleic anyhdride was 0.2% based on total monomer. Also the pH of the first charge was adjusted with acetic acid rather than phosphoric acid. The nonionic surfactant level was held at 1.5 wt. % BOM and the anionic surfactant level was 0.5 wt. % BOM. Different ratios of LS30 to APS 220 were also tested. A decrease in coagulum due to the use of APS 220/LS30 at the 10/55 weight ratio was found relative to the other surfactants. The nonionic blend containing 55% LS30 and 10% APS 220 is a preferred composition.

The mechanical stability imparted to the latex by the APS 220/LS30 surfactant system is superior relative to the other surfactants tested. A decrease in water adsorption for dried films of latex containing APS 220/LS30 surfactant mixtures was observed relative to the other surfactants tested. The minimum film forming temperature (MFT) of the maleic anhydride containing vinyl acrylic latexes made with APS 220/LS30 was found to be 16° C. The MFT of the ABEX containing material was 29° C. The ABEX containing latexes could not form films at room temperature (25° C.). The APS 220/LS30 containing latex films also exhibited better solvent resistance. A summary of the physical and film properties of the maleic anhydride containing vinyl acrylic latex are shown in Table 3.

TABLE 3

Physical and Film Properties of Vinyl Acrylic containing Maleic Anhydride

| Surfactant | Particle Size nm | pH | wt. % Solids | wt. % Coag | Pendulum hardness | Mechanical Stability | $H_2O$ Ads | MEK |
|---|---|---|---|---|---|---|---|---|
| APS220 | 377.5 | 3.9 | 18.42 | 81.57 | 12.00 | TMC | 0 | 81.14 |
| 30/35 LS30/APS 220 | 330.8 | 4.1 | 31.68 | 72.60 | NFF | TMC | NFF | NFF |
| 42.5/22.5 LS30/APS 220 | 220.1 | 3.8 | 22.05 | 49.20 | 6.67 | TMC | 0.0001 | 88.73 |
| 55/10 LS30/APS 220 | 231.3 | 4.0 | 49.79 | 0.18 | 31.67 | 1.6 | 0.0001 | 43.75 |
| TRYCOL | 155.7 | 3.9 | 50.04 | 0.31 | 42.33 | 0.5 | 0.0003 | 63.87 |
| ABEX | 212.6 | 3.8 | 50.36 | 0.44 | NFF | 0.5 | NFF | NFF |

TMC = Too Much Coagulum, NFF = No Film Formed

EXAMPLE 3

The recipe in Table 4 was used to make 100% acrylic latexes.

TABLE 4

100% Acrylic Latex Recipe
Formulation for 100% Acrylic Latex

| Charge 1- In Reactor Ingredient | % active | Wt (g) to use | Active Solids (g) | % based on 100 parts monomer |
|---|---|---|---|---|
| DI water | | 180 | | |
| LS30/APS220 | 65 | 0.52 | 0.34 | 0.075 |
| Heat charge 1 to 80 C. | | | | |
| Purge with $N_2$ | | | | |
| Maintain $N_2$ throughout run | | | | |
| totals | | 180.52 | 0.34 | |

TABLE 4-continued

100% Acrylic Latex Recipe
Formulation for 100% Acrylic Latex

| Charge 1- In Reactor Ingredient | % active | Wt (g) to use | Active Solids (g) | % based on 100 parts monomer |
|---|---|---|---|---|
| Monomer Premix | | | | |
| DI water | | 210 | | |
| Anionic: Avirol 2010 (28%) | 28 | 8.04 | 2.25 | 0.5 |
| LS30/APS220@65% solids | 65 | 17.31 | 11.25 | 2.5 |
| Methyl Methacrylate | 100 | 220 | 220 | 48.03 |
| Butyl acrylate | 100 | 220 | 220 | 48.03 |
| Styrene | 100 | 0 | 0 | 0.00 |
| Methacrylic acid | 100 | 4.5 | 4.5 | 0.98 |
| totals | | 679.84 | 458 | |
| Initiator Premix | | | | |
| DI water | | 55.4 | | |
| Ammonium Persulfate | | 2.25 | 2.25 | 0.5 |
| totals | | 57.65 | 2.25 | |
| Charge 2 | | | | |
| At 80° C. add 25% initiator solution (11.25 g) | | | | |
| Add 5% of the monomer solution (35.7 g) | | | | |
| Hold at 80° C. for 15 minutes | | | | |
| Charge 3 | | | | |
| Feed remaining monomer in over 3 hours (3.8 g/min) | | | | |
| Feed remaining initiator in over the same 3 hours (0.258 g/min ) approx. 6 drops/min | | | | |
| After the 3 hours, heat reactor to 85° C. for 30 minutes | | | | |
| Cool to room temp | | | | |
| percent solids = | | 50.17 | | |
| Adjust pH to 7 if desired | | | | |

In 100% acrylic systems the latex containing LS30/APS 220 blends yielded the lowest levels of coagulum, when the surfactants were used at the same concentration levels (2.5% nonionic based on monomer). The particle size of the LS30 (55%)/APS 220 (10%) surfactant containing latex is statistically equivalent to that of the latex made with Trycol (NPE). Latex films containing LS30/APS 220 exhibited lower water adsorption. Properties are shown in Table 5.

TABLE 5

Physical and Film Properties of 100% Acrylic Latex

| Surfactant | Particle Size (nm) | pH | wt. % solids | wt. % Coag | Pendulum hardness | Mech. Stab (sec) | H2O Ads (%) | MEK Rub (%) |
|---|---|---|---|---|---|---|---|---|
| Trycol | 164 | 1.8 | 50 | 1.4 | 28 | 15 | 0.052 | 93.7 |
| 45/20 LS30/APS 220 | 187 | 2 | 50 | 0.5 | 28 | 144 | 0 | 89.2 |
| 55/10 LS30/APS 220 | 169 | 2.3 | 50 | 0.88 | 28 | 10 | 0.0018 | 98.9 |
| ABEX 2525 | 180 | 2.2 | 50 | 2 | 30 | 30 | 0.0011 | 93.46 |

EXAMPLE 4

A styrene acrylic latex recipe is shown in Table 6

TABLE 6

Styrene Acrylic Latex Recipe
Charge 1- in Reactor

| Ingredient | % active | Wt (g) to use | Active Solids used (g) | % based on 100 parts monomer |
|---|---|---|---|---|
| DI water | | 180 | | |
| LS30/APS220 | 65 | 0.52 | 0.34 | 0.075 |
| Heat charge 1 to 80 C. | | | | |
| Purge with N2 | | | | |
| Maintain N2 throughout run | | | | |
| totals | | 180.52 | 0.34 | |
| Monomer Premix | | | | |
| DI water | | 210 | | |
| Anionic:Avirol 2010 (28%) | 28 | 8.036 | 2.25 | 0.5 |
| LS30/APS220@65% | 65 | 17.31 | 11.25 | 2.5 |
| Methy Methacrylate | 100 | 25 | 25 | 5.35 |
| Butyl acrylate | 100 | 212 | 212 | 45.40 |
| Styrene | 100 | 212 | 212 | 45.40 |
| Methacrylic acid | 100 | 4.5 | 4.5 | 0.96 |
| totals | | 688.84 | 467 | |
| Initiator Premix | | | | |
| DI water | | 55.4 | | |
| Amonium Persulfate | | 2.25 | 2.25 | 0.5 |
| totals | | 57.65 | 2.25 | |
| Charge 2 | | | | |
| At 80 C. add 25% initiator solution (11.25 g) | | | | |
| Add 5% of the monomer solution (35.7 g) | | | | |
| Hold at 80 C. for 15 minutes | | | | |
| Charge 3 | | | | |
| Feed remaining monomer in over 3 hours (3.8 g/min) | | | | |
| Feed remaining initiator in over 3 hours (0.258 g/min) approx 6 drops/min | | | | |
| After 3 hours, heat reactor to 85 C. for 30 minutes | | | | |
| Cool to room temp | | | | |
| percent solids = | | 50.66 | | |
| Adjust pH to 7 if desired | | | | |

The coagulum for the LS30/APS 220 surfactant blends is much lower than for the nonylphenol ethoxylates when used at 2.5% based on monomer with 0.5% anionic present. The particle sizes of the latexes containing the LS30/APS 220 blends are equivalent or slightly lower than the nonylphenol ethoxylates at the same weight percent (2.5% with 0.5% anionic). The water adsorption of styrene acrylic films is decreased by an order of magnitude by replacing the nonyl phenol surfactant (Trycol 6970) with the LS30/APS 220 combination at the same activity level. The film properties are listed in Table 7 below.

TABLE 7

Styrene Acrylic Latex Film Properties

| Surfactants | wt. % Coag | Water Ad % | Pendulum hardness | Mech. Stability | MEK Rub |
|---|---|---|---|---|---|
| Trycol 6970 | 0.5 | 0.06 | 43 | 1.83 | 98.4 |
| LS30(45)/APS220(20) | 0.47 | 0.04 | 48 | 2.75 | 98.5 |
| LS30(55)/APS220(10) | 0.33 | 0.002 | 42 | 2.5 | 99.7 |
| DISPONIL 3065 | 0.25 | 0.001 | 44 | 1.5 | 98.4 |

EXAMPLE 5

Figure 2:
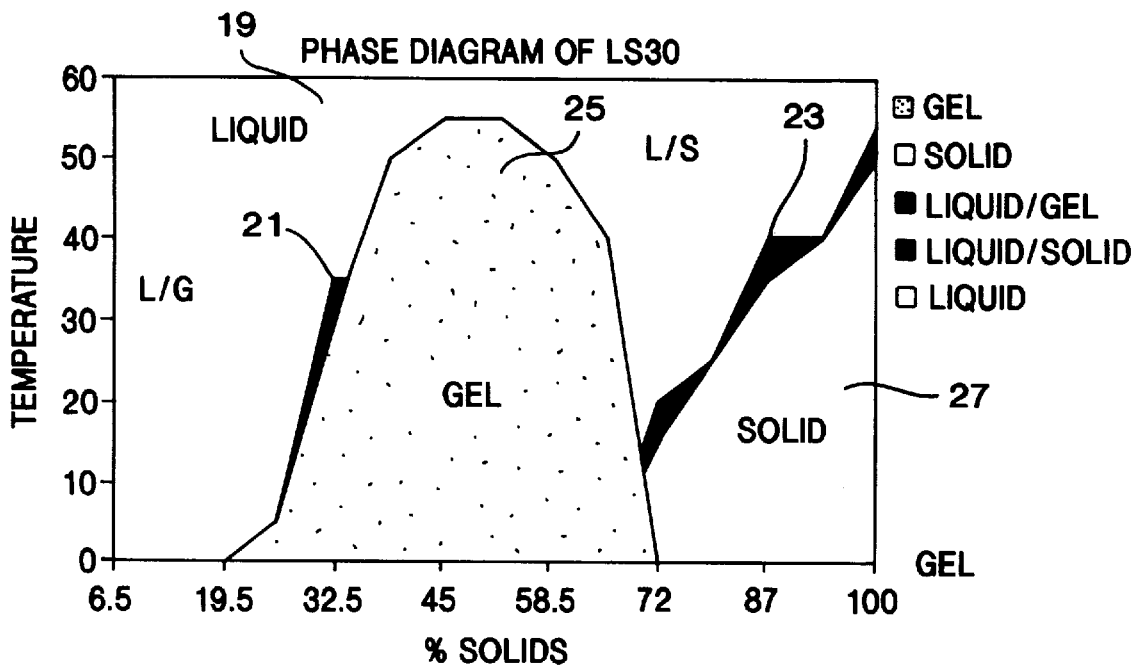
FIG. 2: Shows a binary phase diagram of DISPONIL LS30 (lauryl alcohol 30-ethoxylate), control.
Figure 3:
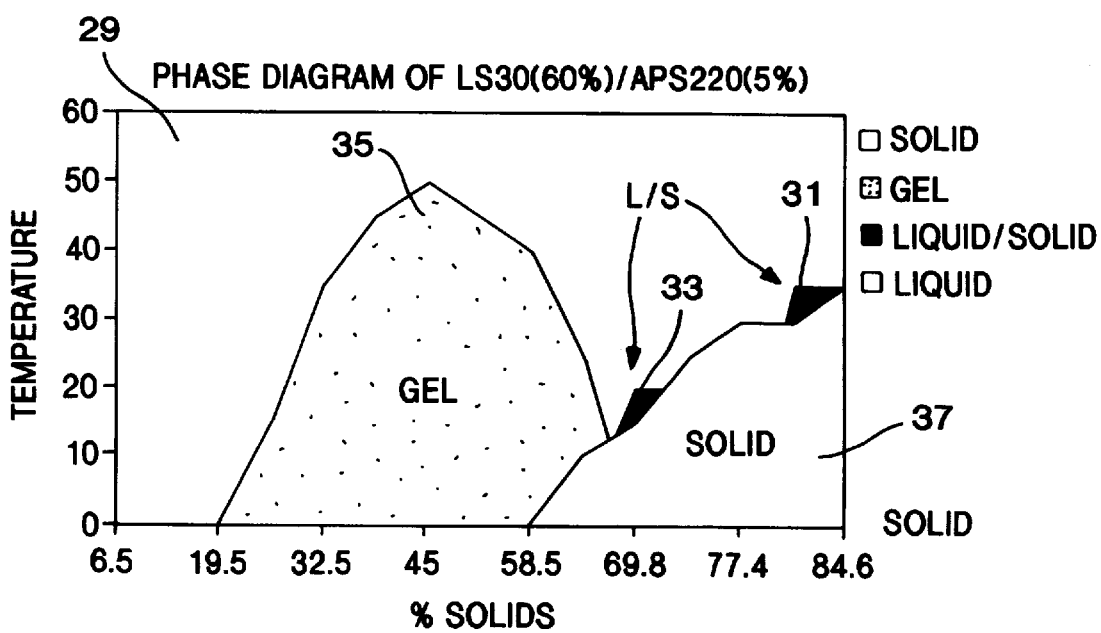
FIG. 3: Shows a binary phase diagram of DISPONIL LS30 (lauryl alcohol 30-ethoxylate), 60:5 (by weight of active material) APS 220, varying the water (100%-% solids).
Figure 4:
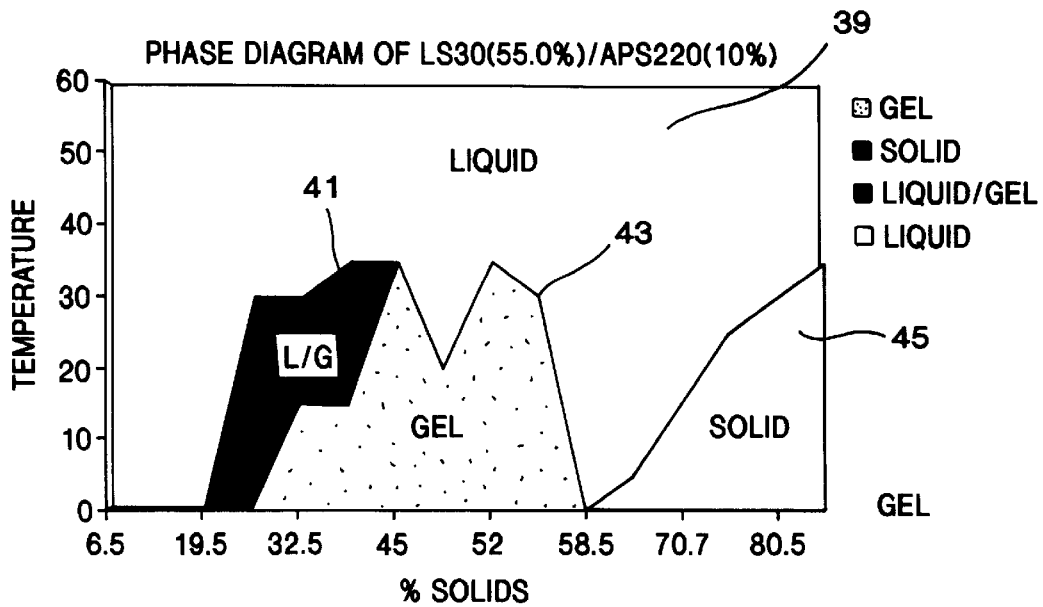
FIG. 4: Shows a binary phase diagram of DISPONIL LS30 (lauryl alcohol 30-ethoxylate), 55:10 (by weight of active material) APS 220, varying the water (100%-% solids).

Binary phase diagrams for the LS 30- APS 220—water surfactant system: The regions of liquid phase are defined in the following phase diagrams. The blends were made at 65% total solids and successively diluted to obtain the lower solids compositions. To make the blends with total solids greater than 65%, the 65% solids blends were put in an oven and water was evaporated to attain the desired high solids composition. The first phase diagram is that of LS 30 alone as a control, FIG. 2, which shows liquid 19, liquid+gel 21, liquid+solid 23, gel 25 and solid 27 phases. LS 30 is a 100% active linear ethoxylated alcohol. The phase diagram of the LS30 (60%)/APS 220 (5%)/water (35%) blend is given in FIG. 3, which shows liquid 29, liquid+solid 31, 33, gel 35 and solid 37 phases. While not wishing to be held to any theory, it is believed that increasing the amount of APS 220 surfactant progessively liquefies the LS 30/APS 220. This is shown in FIGS. 4 through 8:

FIG. 4 shows a binary phase diagram of DISPONIL LS30 (lauryl alcohol 30-ethoxylate), 55:10 (by weight of active material) APS 220, varying the water (100%-% solids), which shows liquid 39, liquid+gel 41, gel 43 and solid 45 phases.

Figure 5:
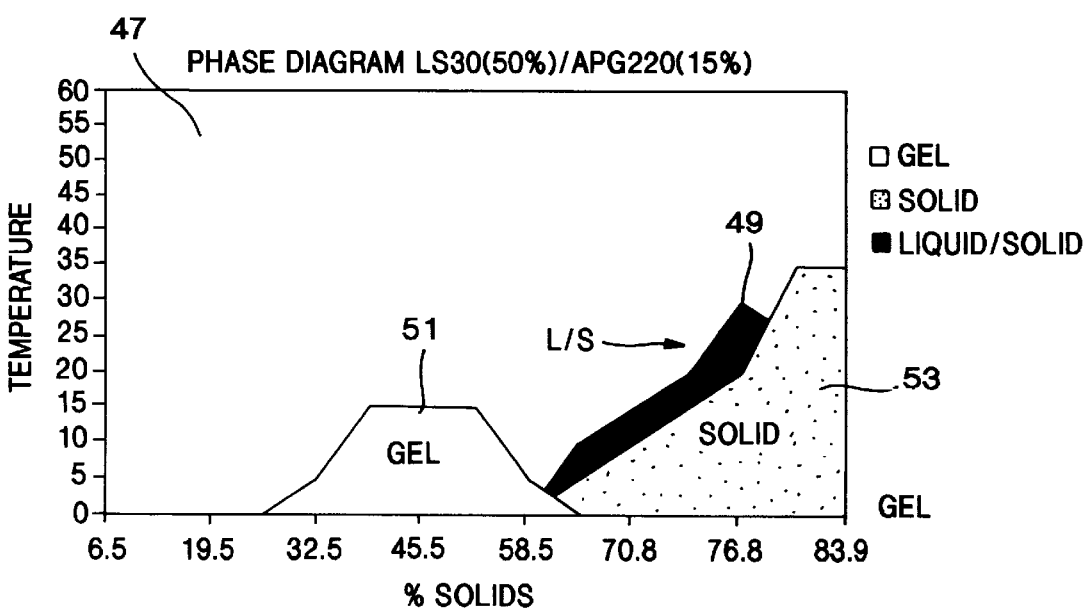
FIG. 5: Shows a binary phase diagram of DISPONIL LS30 (lauryl alcohol 30-ethoxylate), 50:15 (by weight of active material) APS 220, varying the water (100%-% solids).

FIG. 5: Shows a binary phase diagram of DISPONIL LS30 (lauryl alcohol 30-ethoxylate), 50:15 (by weight of active material) APS 220, varying the water (100%-% solids), which shows liquid 47, liquid+solid 49, gel 51 and solid 53 phases. Note that mixture at about 60% solids can be infinitely diluted at 20° C. without passing through a gel phase, making it particularly easy to disperse.

Figure 6:
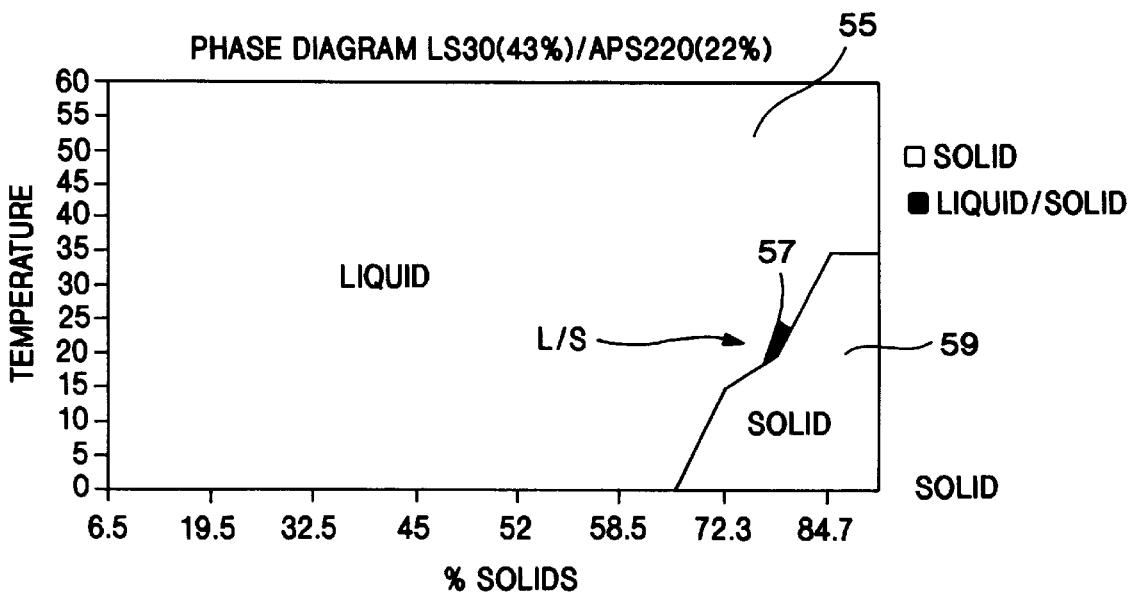
FIG. 6: Shows a binary phase diagram of DISPONIL LS30 (lauryl alcohol 30-ethoxylate), 43:22 (by weight of active material) APS 220, varying the water (100%-% solids).

FIG. 6: Shows a binary phase diagram of DISPONIL LS30 (lauryl alcohol 30-ethoxylate), 43:22 (by weight of active material) APS 220, varying the water (100%-% solids), which shows liquid 55, liquid+solid 57 and solid 59 phases. It has no undesirable gel phase at all above freezing.

Figure 7:
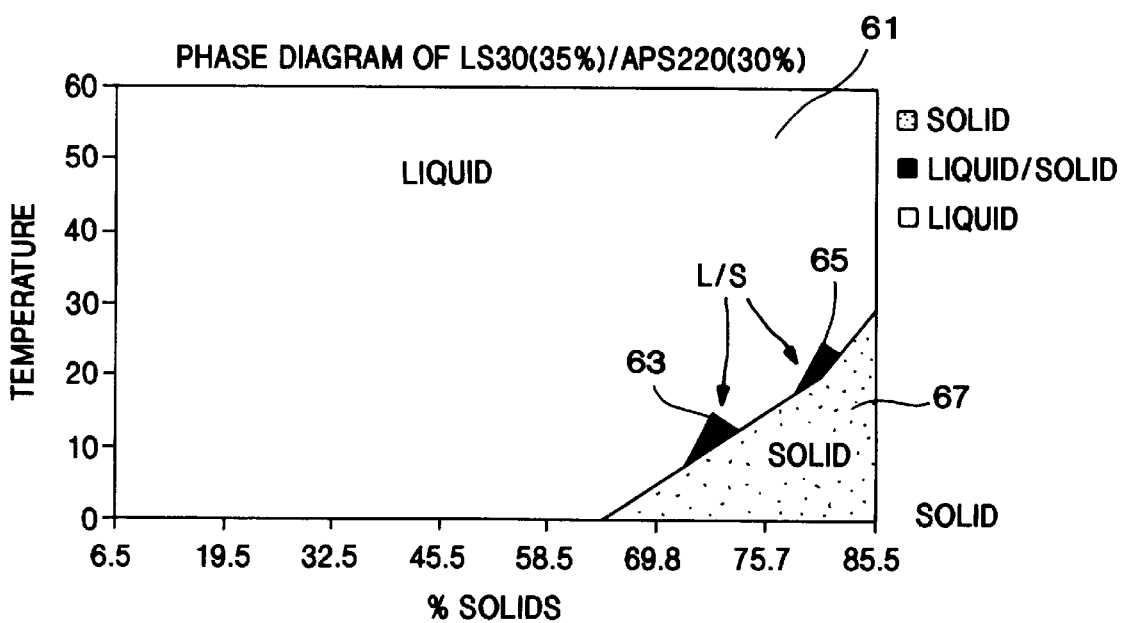
FIG. 7: Shows a binary phase diagram of DISPONIL LS30 (lauryl alcohol 30-ethoxylate), 35:30 (by weight of active material) APS 220, varying the water (100%-% solids).

FIG. 7: Shows a binary phase diagram of DISPONIL® LS30 (lauryl alcohol 30-ethoxylate), 35:30 (by weight of active material) APS 220, varying the water (100%-% solids)), which shows liquid 61, liquid+solid 63, 65 and solid 67 phases. It has no undesirable gel phase at all above freezing.

Figure 8:
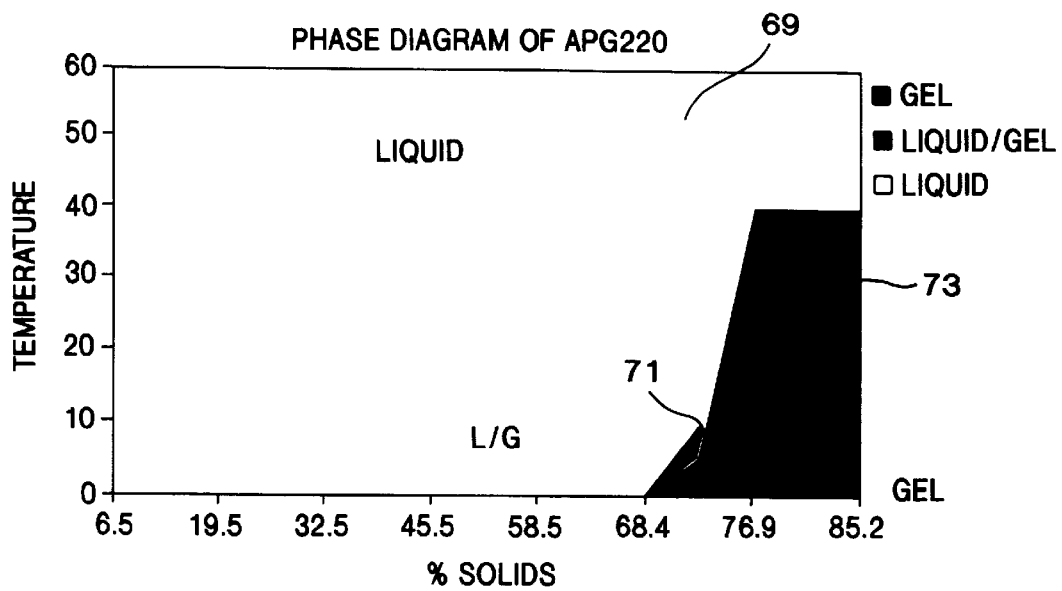
FIG. 8: Shows a binary phase diagram of APS 220 and water, control.

FIG. 8: Shows a binary phase diagram of APS 220 and water, (control), which shows liquid 69, liquid+gel 71 and solid 73 phases.

EXAMPLE 7

Figure 9:
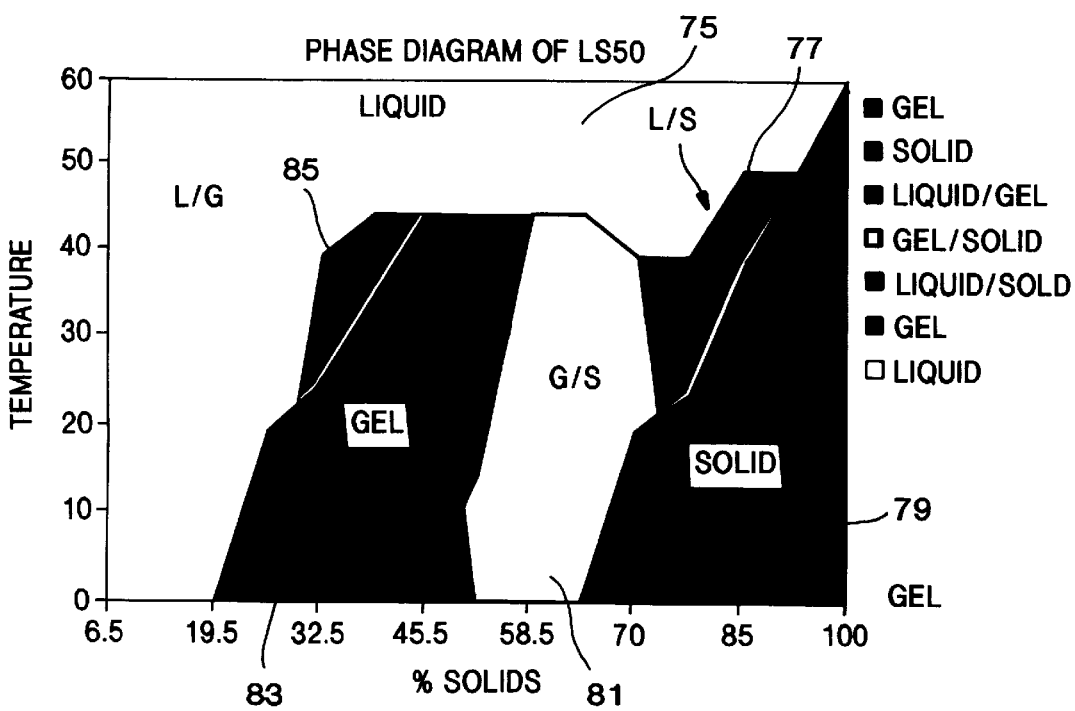
FIG. 9: Shows a binary phase diagram of DISPONIL LS50 (lauryl alcohol 50-ethoxylate) and water, control.
Figure 10:
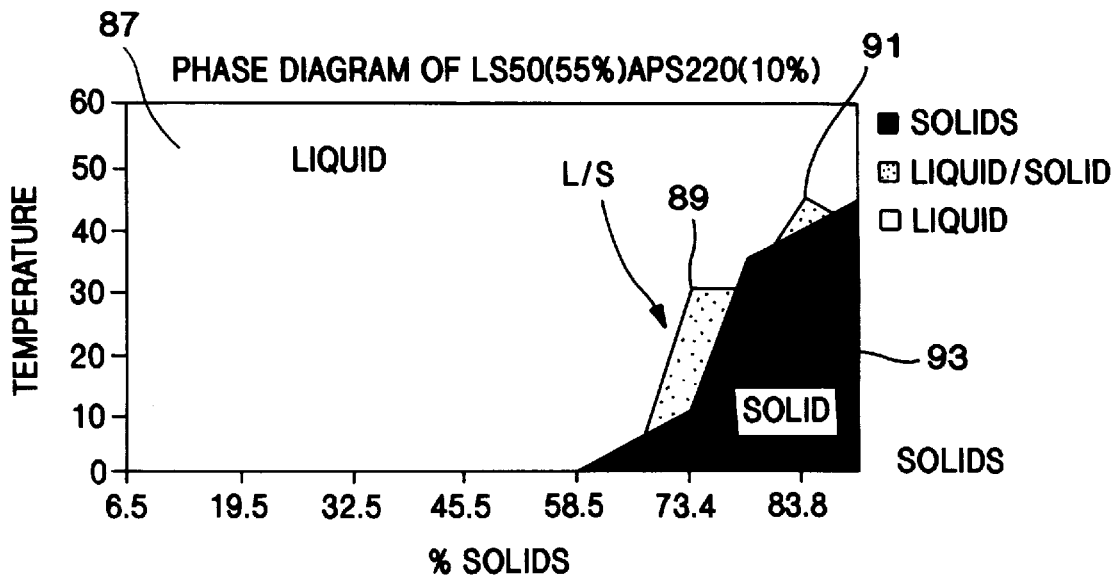
FIG. 10: Shows a binary phase diagram of DISPONIL LS50 (lauryl alcohol 50-ethoxylate), 55:10 (by weight of active material) APS 220, varying the water (100%-% solids).
Figure 11:
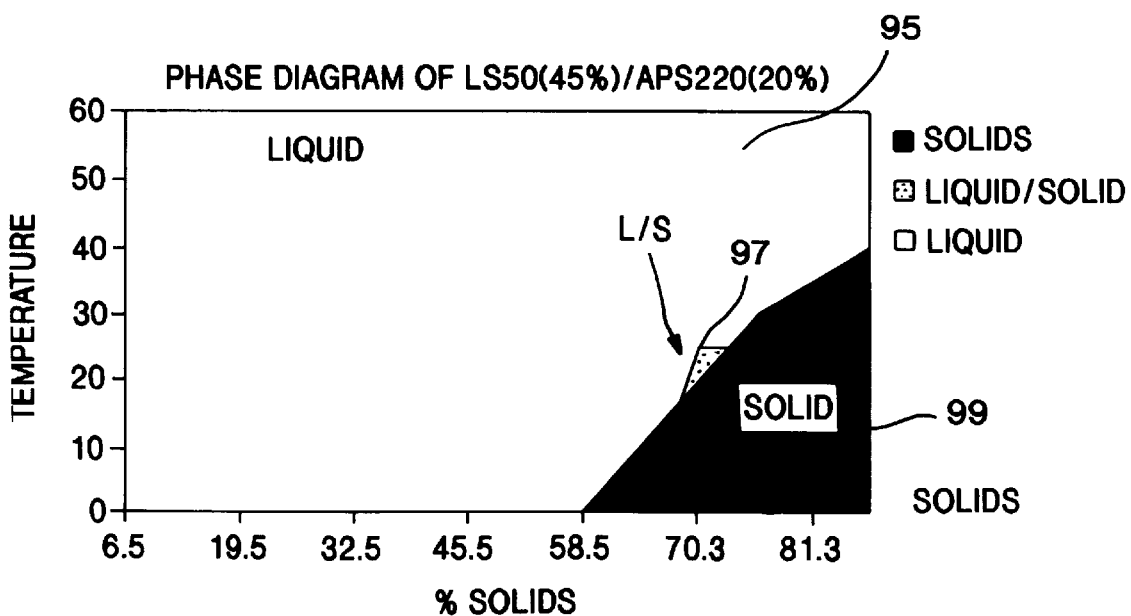
FIG. 11: Shows a binary phase diagram of DISPONIL LS50 (lauryl alcohol 50-ethoxylate), 45:20 (by weight of active material) APS 220, varying the water (100%-% solids).
Figure 12:
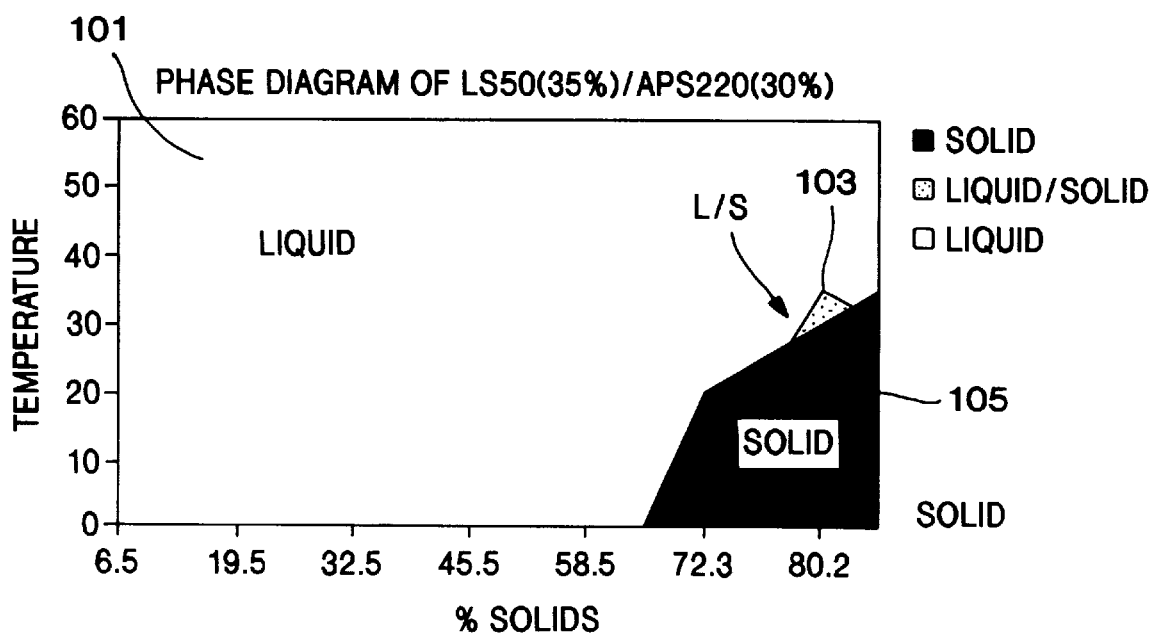
FIG. 12: Shows a binary phase diagram of DISPONIL LS50 (lauryl alcohol 50-ethoxylate), 35:30 (by weight of active material) APS 220, varying the water (100%-% solids).

Binary phase diagrams of the LS 50 (50 mole ethoxylate lauryl alcohol)/APS Surfactant 220/water system: The phase diagram of LS50 is shown in FIG. 9 as a control, which shows liquid 75, liquid+gel 85, gel 83, gel+solid 81, liquid+solid 77 and solid 79 phases. It is mostly solid 79 except at very high temperatures or very low solids content. This makes the material unacceptable as a surfactant for emulsion polymerization. The addition of a small amount of APS 220 surfactant (10% by weight) liquefies 87 the LS50/APS 220 surfactant up to 60% solids, as shown in FIG. 10, which also shows liquid+solid 89, 91 and solid 93 phases. Increasing the APS 220 level in the mixture beyond 10% does not increase the region of liquidity 95 significantly. This is shown in FIG. 11, which also shows liquid+solid 97 and solid 99 phases. At 30% APS 220 the region of liquidity 101 is slightly increased from 60% total solids to about 65% total solids, as displayed in FIG. 12, which also shows liquid+solid 103 and solid 105 phases.

Figure 13:
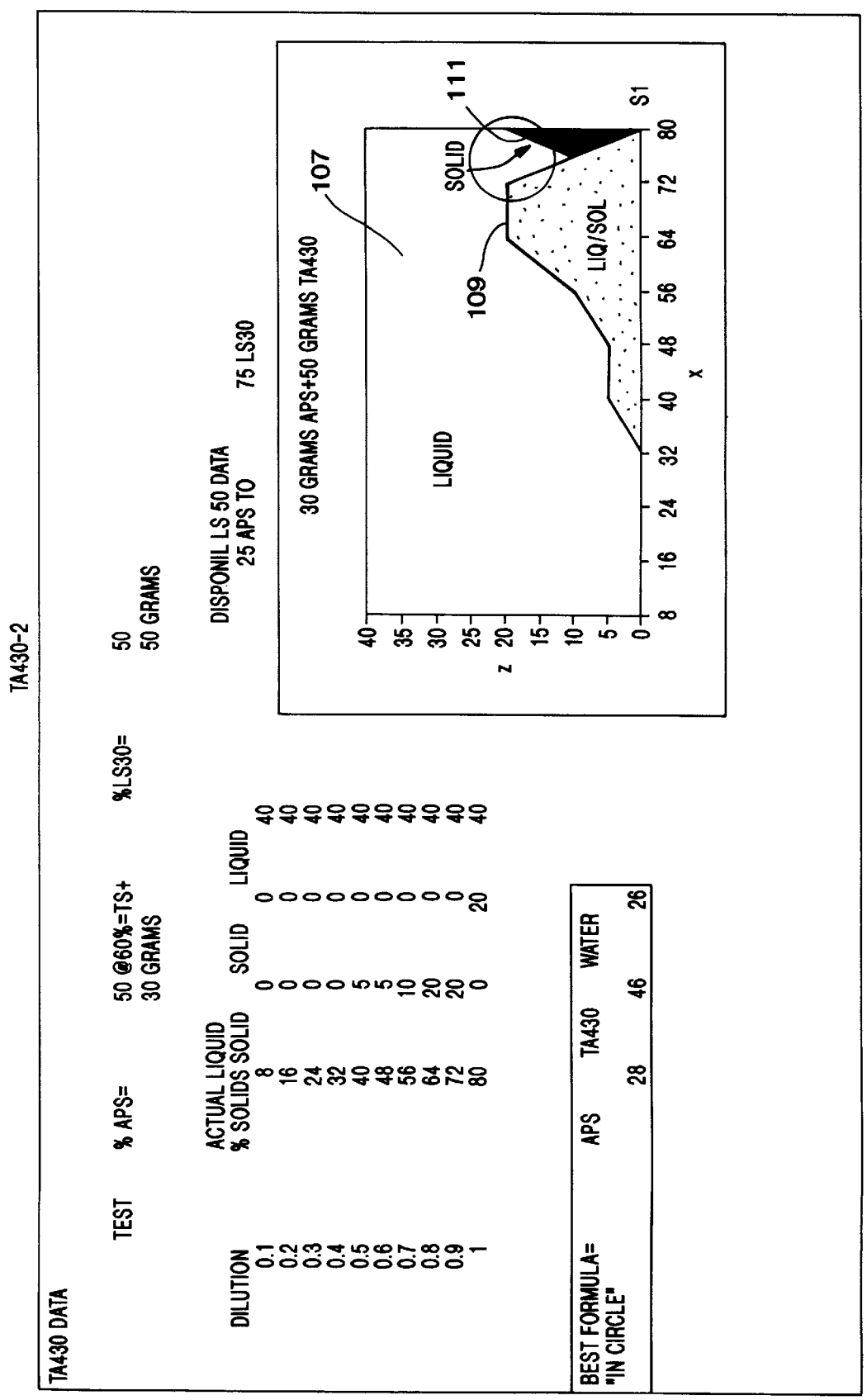
FIG. 13: Shows a binary phase diagram of TA 430 (TM Henkel Corp., tallow alcohol 40-ethoxylate), 50:30 (by weight of active material) APS 220, varying the water (100%-% solids).

Mixtures of tallow alcohol 40-ethoxylate were made with APS 220: FIG. 13: Shows a binary phase diagram of TA 430 (TM Henkel Corp., tallow alcohol 40-ethoxylate), 50:30 (by weight of active material) APS 220, varying the water (100%-% solids), which shows liquid 107, liquid+solid 109 and solid 111 phases.

Figure 14:
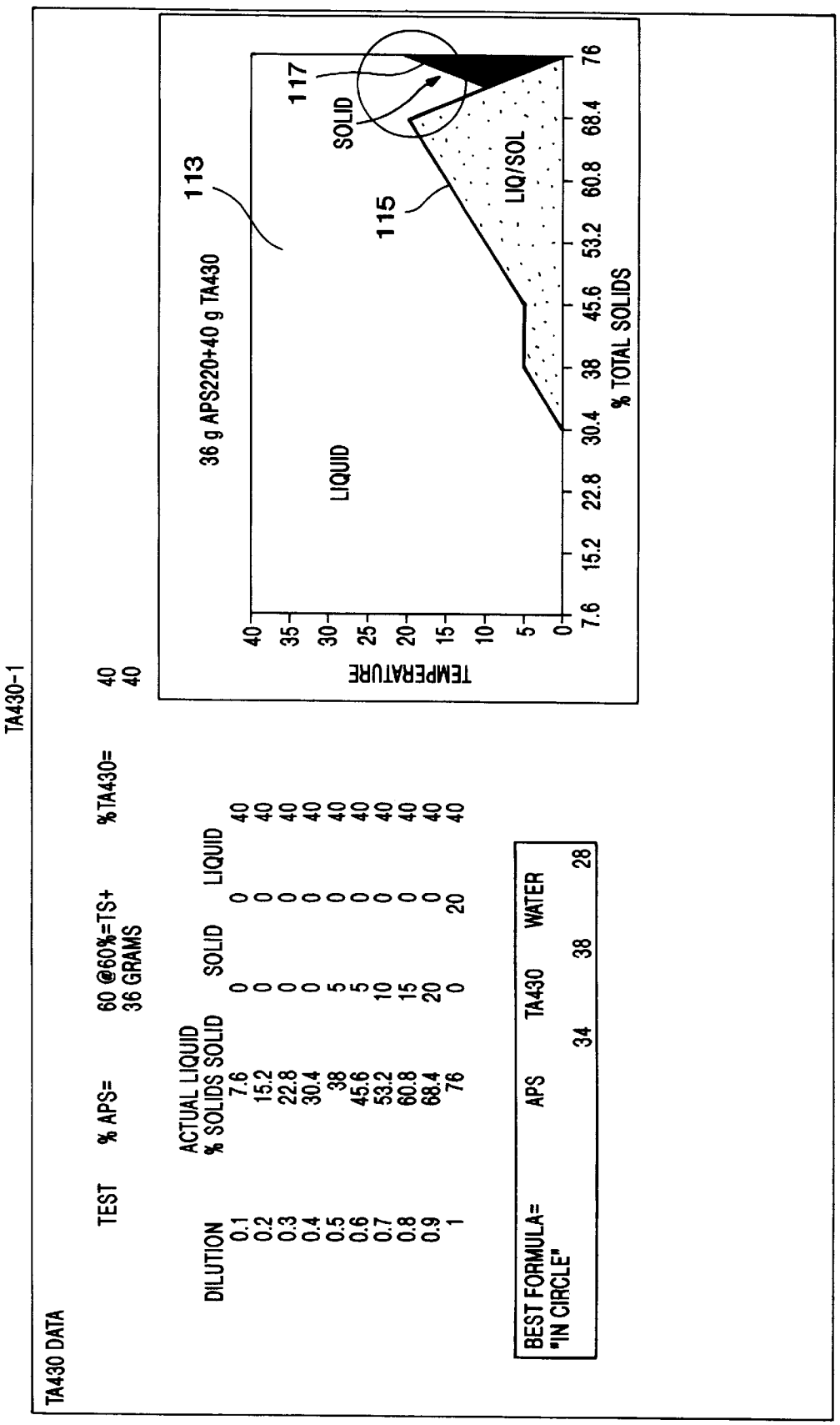
FIG. 14: Shows a binary phase diagram of TA 430 (TM Henkel Corp., tallow alcohol 40-ethoxylate), 40:36 (by weight of active material) APS 220, varying the water (100%-% solids).

FIG. 14: Shows a binary phase diagram of TA 430 (TM Henkel Corp., tallow alcohol 40-ethoxylate), 40:36 (by weight of active material) APS 220, varying the water (100%-% solids), which shows liquid 113, liquid+solid 115 and solid 117 phases.

EXAMPLE 8

Vinyl acrylic latex made with LS50/APS 220 surfactant blends: the recipe for vinyl acrylic latex disclosed in Example 1 was made. The LS30/APS 220 surfactant blend was replaced with the LS50/APS 220 surfactant blend. The vinyl acrylic latex was also made using the Trycol® 6970 (nonyl phenol 40 mole ethoxylate) surfactant. It was found that the water adsorption of the LS50/APS 220 surfactant containing latexes was much lower than the Trycol® 6970. The LS50/APS 220 surfactant blend containing latex exhibited significantly lower coagulum compared to the latex made with the Trycol® 6970. The mechanical stability of the LS50/APS 220 surfactant containing latex was significantly greater than the latex made with Trycol® 6970. These results are shown in Table 8 and 9.

TABLE 8

Vinyl Acrylic Latex Physical Properties

| LS50 | pH | % Solids | Particle Size | % Coagulation | Hardness |
|---|---|---|---|---|---|
| 5510 | 4.7 | 47.81 | 165 | 0.15 | 64.67 |
| 4520 | 4.8 | 47.65 | 164.8 | 0.43 | 66.67 |
| 3530 | 5.0 | 47.24 | 178.4 | 0.11 | 69.33 |
| Trycol 6970 | 4.8 | 47.49 | 156.9 | 0.40 | 69.33 |
| DISPONIL 3065 | 4.7 | 49.69 | 188.6 | 0.34 | 74.33 |

5510, 4520 and 3550 denote 55/10, 45/20, 35/30 solids blend ratios of LS50/APS 220 surfactant respectively.

TABLE 9

Physical and Film Properties of Vinyl Acrylic Latex

| LS50 | Water Adsorption | Mechanical Stability | MEK Loss |
|---|---|---|---|
| 5510 | 0.0008 | 0.33 | 98.21 |
| 4520 | 0.0009 | 0.25 | 98.98 |
| 3530 | 0.0007 | 0.17 | 98.52 |
| Trycol 6970 | 0.0029 | 0.17 | 99.89 |
| Disponil 3065 | 0.0015 | 0.17 | 99.68 |

Vinyl acrylic latexes made with TA30/APS 220 surfactant blends and TA430/APS 220 surfactant blends: in general latexes made with TA430/APS 220 surfactant blends, TA30/APS 220 surfactant blends, TA430/APS 600 surfactant blends and TA30/APS 600 surfactant blends yielded less coagulum than latexes made with TA430 or TA30 alone or with Trycol® 6970 as shown in Example 1.

TABLE 10

Physical Properties of Vinyl Acrylic Latex

| Anionic surfactant | Nonioinic surfactants | % solid | particle size (nm) | coagulum (g) | COAG % BOM | pH |
|---|---|---|---|---|---|---|
| Avirol 2010 (0.5%) | Trycol (1%) | 45.20% | 178.4 | 1.4 | 0.52 | 5.7 |
| Avirol 2010 (0.5%) | DISPONIL 4065 (1%) | 43.60% | 196.5 | 1 | 0.37 | 5.6 |
| Avirol 2010 (0.5%) | DISPONIL 3065 (1%) | 43.60% | 210.9 | 0.9 | 0.33 | 5.2 |
| Avirol 2010 (0.5%) | APS 220UP (1%) | 45.00% | 184.8 | 0.6 | 0.22 | 4.8 |
| Avirol 2010 (0.5%) | APS 600UP (1%) | 44.10% | 218.6 | 0.73 | 0.27 | 6.6 |
| Avirol 2010 (0.5%) | DISPONIL LS 30 + APS | 42.00% | 201.8 | 0.6 | 0.22 | 6.1 |

TABLE 10-continued

Physical Properties of Vinyl Acrylic Latex

| Anionic surfactant | Nonioinic surfactants | % solid | particle size (nm) | coagulum (g) | COAG % BOM | pH |
|---|---|---|---|---|---|---|
| Avirol 2010 (0.5%) | DISPONIL LS 30 (1%) | 44.40% | 257.3 | 0.8 | 0.30 | 6 |
| Avirol 2010 (0.5%) | DISPONIL TA 430 + APS 220 (1%) | 48.00% | 181.8 | 0.5 | 0.19 | 3.3 |
| Avirol 2010 (0.5%) | DISPONIL TA 430 + APS 600 (1%) | 47.80% | 251.3 | 1.3 | 0.48 | 2.6 |
| Avirol 2010 (0.5%) | DISPONIL TA 430 (1%) | 48.10% | 190.3 | 5.6 | 2.07 | 3.6 |
| Avirol 2010 (0.5%) | DISPONIL TA 30 + APS 220 (1%) | 48.50% | 210.4 | 0.8 | 0.30 | 3.1 |
| Avirol 2010 (0.5%) | DISPONIL TA 30 + APS 600 (1%) | 48.30% | 206.8 | 1.1 | 0.41 | 2.7 |
| Avirol 2010 (0.5%) | DISPONIL TA 30 (1%) | 48.00% | 258.7 | 1.2 | 0.44 | 3 |
| Avirol 2010 (0.5%) | DISPONIL TA 10 + APS 220 (1%) | 48.80% | 175 | 0.64 | 0.24 | 4.5 |
| Avirol 2010 (0.5%) | DISPONIL TA 10 (1%) | 47.50% | 177 | 7.9 | 2.93 | 5.9 |

Note: "UP" designates the unpreserved versions of the respective commercial APSs

What is claimed is:

1. A surfactant composition comprising:
   about 39 weight % to about 76 weight % of a fatty alcohol ethoxylate having a degree of ethoxylation of at least 14;
   about 4 weight % to about 40 weight % alkyl polyglycoside; and
   about 20 weight % to about 60 weight water, wherein the weight % is of the total of the fatty alcohol ethoxylate plus alkylpolyglycoside plus water, wherein said composition is a liquid at room temperature, free of gel or solid phase.

2. The composition of claim 1, wherein said composition remains liquid upon dilution with water at about room temperature.

3. The composition of claim 1, comprising:
   about 39 to about 67.5 weight % of a fatty alcohol ethoxylate having a degree of ethoxylation of at least 14;
   about 5 to about 35 weight % alkylpolyglycoside; and
   about 22 weight % to about 45 weight % water.

4. The composition of claim 1, wherein the degree of ethoxylation ranges from about 20 to about 50.

5. The composition of claim 1, wherein the ethoxylated fatty alcohol is substantially tallow alcohol40-ethoxylate.

6. The composition of claim 1, wherein the ethoxylated fatty alcohol is substantially lauryl alcohol-30-ethoxylate.

7. The composition of claim 1, wherein the ethoxylated fatty alcohol is substantially lauryl alcohol-20-ethoxylate.

8. The composition of claim 1, wherein the ethoxylated fatty alcohol is substantially lauryl alcohol-50-ethoxylate.

9. The composition of claim 1, wherein the ethoxylated fatty alcohol is substantially lauryl alcohol-40-ethoxylate.

10. The composition of claim 1, wherein the ethoxylated fatty alcohol is substantially tallow-20-ethoxylate.

11. The composition of claim 1, wherein the ethoxylated fatty alcohol is substantially tallow-30-ethoxylate.

12. The composition of claim 1, wherein the alkyl group of the alkylpolyglycoside is about $C_8$ to about $C_{10}$.

13. The composition of claim 1, wherein the alkyl group of the alkylpolyglycoside is about $C_{12}$ to about $C_{16}$.

14. The composition of claim 1, wherein the average glycoside residue degree of polymerization of the alkylpolyglycoside is about 1.5.

15. The composition of claim 1, wherein the average glycoside residue degree of polymerization of the alkylpolyglycoside is about 1.4 to about 1.8.

16. The composition of claim 1, comprising:
   about 46 wt. % lauryl alcohol-30-ethoxylate;
   about 19 wt. % of an alkylpolyglycoside having an alkyl group with an average carbon chain of about 9 and with an average glycoside residue degree of polymerization of about 1.5; and
   about 35 wt. % water.

17. The composition of claim 1, comprising:
   about 46 wt. % tallow alcohol-40-ethoxylate;
   about 28 wt. % of an alkylpolyglycoside having an alkyl group with an average carbon chain of about 9 and with an average glycoside residue degree of polymerization of about 1.5; and
   about 26 wt. % water.

18. The composition of claim 1, comprising:
   about 46 wt. % lauryl alcohol-20-ethoxylate;
   about 19 wt. % of an alkylpolyglycoside having an alkyl group with an average carbon chain of about 9 and with an average glycoside residue degree of polymerization of about 1.5; and
   about 35 wt. % water.

19. The composition of claim 1, comprising:
   about 46 wt. % lauryl alcohol-50-ethoxylate;
   about 19 wt. % of an alkylpolyglycoside having an alkyl group with an average carbon chain of about 9 and with an average glycoside residue degree of polymerization of about 1.5; and
   about 35 wt. % water.

20. The composition of claim 1, comprising:
   about 46 wt. % lauryl alcohol-40-ethoxylate;
   about 19 wt. % of an alkylpolyglycoside having an alkyl group with an average carbon chain of about 9 and with an average glycoside residue degree of polymerization of about 1.5; and
   about 35 wt. % water.

21. The composition of claim 1, comprising:
   about 55 wt. % lauryl alcohol-30-ethoxylate;

about 10 wt. % of an alkylpolyglycoside having an alkyl group with an average carbon chain of about 9 and with an average glycoside residue degree of polymerization of about 1.5; and about 35 wt. % water.

22. The composition of claim 1, comprising:

about 50.2 wt. % lauryl alcohol-20-ethoxylate;

about 16.8 wt. % of an alkylpolyglycoside having an alkyl group with an average carbon chain of about 9 and with an average glycoside residue degree of polymerization of about 1.5; and about 33 wt. % water.

23. The composition of claim 1, comprising:

about 50 wt. % lauryl alcohol-20-ethoxylate;

about 15 wt. % of an alkylpolyglycoside having an alkyl group with an average carbon chain of about 9 and with an average glycoside residue degree of polymerization of about 1.5; and about 35 wt. % water.

24. The composition of claim 1, comprising:

about 48 wt. % lauryl alcohol-40-ethoxylate;

about 16 wt. % of an alkylpolyglycoside having an alkyl group with an average carbon chain of about 9 and with an average glycoside residue degree of polymerization of about 1.5; and about 36 wt. % water.

25. The composition of claim 1, comprising:

about 55.5 wt. % lauryl alcohol-50-ethoxylate;

about 18.5 wt. % of an alkylpolyglycoside having an alkyl group with an average carbon chain of about 9 and with an average glycoside residue degree of polymerization of about 1.5; and about 26 wt. % water.

26. The composition of claim 1, comprising:

about 50 wt. % lauryl alcohol-30-ethoxylate;

about 15 wt. % of an alkylpolyglycoside having an alkyl group with an average carbon chain of about 9 and with an average glycoside residue degree of polymerization of about 1.5; and about 35 wt. % water.

27. The composition of claim 1, comprising:

about 38 wt. % tallow alcohol-40-ethoxylate;

about 34 wt. % of an alkylpolyglycoside having an alkyl group with an average carbon chain of about 9 and with an average glycoside residue degree of polymerization of about 1.5; and about 28 wt. % water.

28. A stable latex composition, which comprises the product of combining:

(a) a surfactant composition comprising:
about 39 weight % to about 76 weight % of a fatty alcohol ethoxylate having a degree of ethoxylation of at least 14;
about 4 weight % to about 40 weight % alkylpolyglycoside; and
about 20 weight % to about 60 weight % water, wherein the weight % is of the total of the fatty alcohol ethoxylate plus alkylpolyglycoside plus water;

(b) water;

(c) an effective amount of initiator, and (d) at least one substantially water-insoluble monomer.

29. The latex composition of claim 28, wherein the surfactant composition comprises:

about 39 to about 67.5 weight % of a fatty alcohol ethoxylate having a degree of ethoxylation of at least 14;

about 5 to about 35 weight % alkylpolyglycoside; and about 22 weight % to about 45 weight % water.

30. The latex composition of claim 28, wherein the degree of ethoxylation ranges from about 20 to about 50.

31. The latex composition of claim 28, wherein the ethoxylated fatty alcohol is substantially tallow alcohol40-ethoxylate.

32. The latex composition of claim 28, wherein the ethoxylated fatty alcohol is substantially lauryl alcohol-30-ethoxylate.

33. The latex composition of claim 28, wherein the ethoxylated fatty alcohol is substantially lauryl alcohol-20-ethoxylate.

34. The latex composition of claim 28, wherein the ethoxylated fatty alcohol is substantially lauryl alcohol-50-ethoxylate.

35. The latex composition of claim 28, wherein the ethoxylated fatty alcohol is substantially lauryl alcohol40-ethoxylate.

36. The latex composition of claim 28, wherein the ethoxylated fatty alcohol is substantially tallow-20-ethoxylate.

37. The latex composition of claim 28, wherein the ethoxylated fatty alcohol is substantially tallow-30-ethoxylate.

38. The latex composition of claim 28, wherein the alkyl group of the alkylpolyglycoside is about $C_8$ to about $C_{10}$.

39. The latex composition of claim 28, wherein the alkyl group of the alkylpolyglycoside is about $C_{12}$ to about $C_{16}$.

40. The latex composition of claim 28, wherein the average glycoside residue degree of polymerization of the alkylpolyglycoside is about 1.5.

41. The latex composition of claim 28, wherein the average glycoside residue degree of polymerization of the alkylpolyglycoside is about 1.4 to about 1.8.

42. The latex composition of claim 28, wherein the surfactant composition comprises:

about 46 wt. % lauryl alcohol-30-ethoxylate;

about 19 wt. % of an alkylpolyglycoside having an alkyl group with an average carbon chain of about 9 and with an average glycoside residue degree of polymerization of about 1.5; and about 35 wt. % water.

43. The latex composition of claim 28, wherein the surfactant composition comprises:

about 46 wt. % tallow alcohol-40-ethoxylate;

about 28 wt. % of an alkylpolyglycoside having an alkyl group with an average carbon chain of about 9 and with an average glycoside residue degree of polymerization of about 1.5; and about 26 wt. % water.

44. The latex composition of claim 28, wherein the surfactant composition comprises:

about 46 wt. % lauryl alcohol-20-ethoxylate;

about 19 wt. % of an alkylpolyglycoside having an alkyl group with an average carbon chain of about 9 and with an average glycoside residue degree of polymerization of about 1.5; and about 35 wt. % water.

45. The latex composition of claim 28, wherein the surfactant composition comprises:

about 46 wt. % lauryl alcohol-50-ethoxylate;

about 19 wt. % of an alkylpolyglycoside having an alkyl group with an average carbon chain of about 9 and with an average glycoside residue degree of polymerization of about 1.5; and about 35 wt. % water.

46. The latex composition of claim 28, wherein the surfactant composition comprises:

about 46 wt. % lauryl alcohol-40-ethoxylate;

about 19 wt. % of an alkylpolyglycoside having an alkyl group with an average carbon chain of about 9 and with an average glycoside residue degree of polymerization of about 1.5; and about 35 wt. % water.

47. The latex composition of claim 28, wherein the surfactant composition comprises:

about 55 wt. % lauryl alcohol-30-ethoxylate;

about 10 wt. % of an alkylpolyglycoside having an alkyl group with an average carbon chain of about 9 and with an average glycoside residue degree of polymerization of about 1.5; and about 35 wt. % water.

48. The latex composition of claim 28, wherein the surfactant composition comprises:

about 50.2 wt. % lauryl alcohol-20-ethoxylate;

about 16.8 wt. % of an alkylpolyglycoside having an alkyl group with an average carbon chain of about 9 and with an average glycoside residue degree of polymerization of about 1.5; and about 33 wt. % water.

49. The latex composition of claim 28, wherein the surfactant composition comprises:

about 50 wt. % lauryl alcohol-20-ethoxylate;

about 15 wt. % of an alkylpolyglycoside having an alkyl group with an average carbon chain of about 9 and with an average glycoside residue degree of polymerization of about 1.5; and about 35 wt. % water.

50. The latex composition of claim 28, wherein the surfactant composition comprises:

about 48 wt. % lauryl alcohol40-ethoxylate;

about 16 wt. % of an alkylpolyglycoside having an alkyl group with an average carbon chain of about 9 and with an average glycoside residue degree of polymerization of about 1.5; and about 36 wt. % water.

51. The latex composition of claim 28, wherein the surfactant composition comprises:

about 55.5 wt. % lauryl alcohol-50-ethoxylate;

about 18.5 wt. % of an alkylpolyglycoside having an alkyl group with an average carbon chain of about 9 and with an average glycoside residue degree of polymerization of about 1.5; and about 26 wt. % water.

52. The latex composition of claim 28, wherein the surfactant composition comprises:

about 38 wt. % tallow alcohol-40-ethoxylate;

about 34 wt. % of an alkylpolyglycoside having an alkyl group with an average carbon chain of about 9 and with an average glycoside residue degree of polymerization of about 1.5; and about 28 wt. % water.

53. The latex composition of claim 28, wherein the water-insoluble monomer is selected from the group consisting of vinyl acetate, butyl acrylate, styrene, butadiene, methylmethacrylate, methylacrylate, chloroprene, vinyl chloride, acrylonitrile, ethylene, vinyl versatate, ethyl acrylate, maleic anhydride, 2-ethyl hexyl acrylate and mixtures thereof.

54. The latex composition of claim 28, wherein the surfactant composition comprises:

about 50 wt. % lauryl alcohol-30-ethoxylate;

about 15 wt. % of an alkylpolyglycoside having an alkyl group with an average carbon chain of about 9 and with an average glycoside residue degree of polymerization of about 1.5; and about 35 wt. % water.

55. A process for emulsion polymerization, comprising the step of reacting:

(a) a surfactant composition comprising:

about 39 weight % to about 76 weight % of a fatty alcohol ethoxylate having a degree of ethoxylation of at least 14;

about 4 weight % to about 40 weight % alkylpolyglycoside; and about 20 weight % to about 60 weight % water, wherein the weight % is of the total of the fatty alcohol ethoxylate plus alkylpolyglycoside plus water, (b) water;

(c) an effective amount of initiator; and (d) at least one substantially water-insoluble monomer, to form a stable latex composition.

56. The process of claim 55, wherein the surfactant composition comprises:

about 39 to about 67.5 weight % of a fatty alcohol ethoxylate having a degree of ethoxylation of at least 14;

about 5 to about 35 weight % alkylpolyglycoside; and about 22 weight % to about 45 weight % water.

57. The process of claim 55, wherein the degree of ethoxylation ranges from about 20 to about 50.

58. The process of claim 55, wherein the ethoxylated fatty alcohol is substantially tallow alcohol-40-ethoxylate.

59. The process of claim 55, wherein the ethoxylated fatty alcohol is substantially lauryl alcohol-30-ethoxylate.

60. The process of claim 55, wherein the ethoxylated fatty alcohol is substantially lauryl alcohol-20-ethoxylate.

61. The process of claim 55, wherein the ethoxylated fatty alcohol is substantially lauryl alcohol-50-ethoxylate.

62. The process of claim 55, wherein the ethoxylated fatty alcohol is substantially lauryl alcohol-40-ethoxylate.

63. The process of claim 55, wherein the ethoxylated fatty alcohol is substantially tallow-20-ethoxylate.

64. The process of claim 55, wherein the ethoxylated fatty alcohol is substantially tallow-30-ethoxylate.

65. The process of claim 55, wherein the alkyl group of the alkylpolyglycoside is about $C_8$ to about $C_{10}$.

66. The process of claim 55, wherein the alkyl group of the alkylpolyglycoside is about $C_{12}$ to about $C_{16}$.

67. The process of claim 55, wherein the average glycoside residue degree of polymerization of the alkylpolyglycoside is about 1.5.

68. The process of claim 55, wherein the average glycoside residue degree of polymerization of the at least one alkylpolyglycoside is about 1.4 to about 1.8.

69. The process of claim 55, wherein the surfactant composition comprises:

about 46 wt. % lauryl alcohol-30-ethoxylate;

about 19 wt. % of an alkylpolyglycoside having an alkyl group with an average carbon chain of about 9 and with an average glycoside residue degree of polymerization of about 1.5; and about 35 wt. % water.

70. The process of claim 55, wherein the surfactant composition comprises:
about 46 wt. % tallow alcohol-40-ethoxylate;
about 28 wt. % of an alkylpolyglycoside having an alkyl group with an average carbon chain of about 9 and with an average glycoside residue degree of polymerization of about 1.5; and
about 26 wt. % water.

71. The process of claim 55, wherein the surfactant composition comprises:
about 46 wt. % lauryl alcohol-20-ethoxylate;
about 19 wt. % of an alkylpolyglycoside having an alkyl group with an average carbon chain of about 9 and with an average glycoside residue degree of polymerization of about 1.5; and
about 35 wt. % water.

72. The process of claim 55, wherein the surfactant composition comprises:
about 46 wt. % lauryl alcohol-50-ethoxylate;
about 19 wt. % of an alkylpolyglycoside having an alkyl group with an average carbon chain of about 9 and with an average glycoside residue degree of polymerization of about 1.5; and
about 35 wt. % water.

73. The process of claim 55, wherein the surfactant composition comprises:
about 46 wt. % lauryl alcohol-40-ethoxylate;
about 19 wt. % of an alkylpolyglycoside having an alkyl group with an average carbon chain of about 9 and with an average glycoside residue degree of polymerization of about 1.5; and
about 35 wt. % water.

74. The process of claim 55, wherein the surfactant composition comprises:
about 55 wt. % lauryl alcohol-30-ethoxylate;
about 10 wt. % of an alkylpolyglycoside having an alkyl group with an average carbon chain of about 9 and with an average glycoside residue degree of polymerization of about 1.5; and
about 35 wt. % water.

75. The process of claim 55, wherein the surfactant composition comprises:
about 50.2 wt. % lauryl alcohol-20-ethoxylate;
about 16.8 wt. % of an alkylpolyglycoside having an alkyl group with an average carbon chain of about 9 and with an average glycoside residue degree of polymerization of about 1.5; and
about 33 wt. % water.

76. The process of claim 55, wherein the surfactant composition comprises:
about 50 wt. % lauryl alcohol-20-ethoxylate;
about 15 wt. % of an alkylpolyglycoside having an alkyl group with an average carbon chain of about 9 and with an average glycoside residue degree of polymerization of about 1.5; and
about 35 wt. % water.

77. The process of claim 55, wherein the surfactant composition comprises:
about 48 wt. % lauryl alcohol-40-ethoxylate;
about 16 wt. % of an alkylpolyglycoside having an alkyl group with an average carbon chain of about 9 and with an average glycoside residue degree of polymerization of about 1.5; and
about 36 wt. % water.

78. The process of claim 55, wherein the surfactant composition comprises:
about 55.5 wt. % lauryl alcohol-50-ethoxylate;
about 18.5 wt. % of an alkylpolyglycoside having an alkyl group with an average carbon chain of about 9 and with an average glycoside residue degree of polymerization of about 1.5; and
about 26 wt. % water.

79. The process of claim 55, wherein the surfactant composition comprises:
about 50 wt. % lauryl alcohol-30-ethoxylate;
about 15 wt. % of an alkylpolyglycoside having an alkyl group with an average carbon chain of about 9 and with an average glycoside residue degree of polymerization of about 1.5; and
about 35 wt. % water.

80. The process of claim 55, wherein the surfactant composition comprises:
about 38 wt. % tallow alcohol-40-ethoxylate;
about 34 wt. % of an alkylpolyglycoside having an alkyl group with an average carbon chain of about 9 and with an average glycoside residue degree of polymerization of about 1.5; and
about 28 wt. % water.

81. The process of claim 55, wherein the water-insoluble monomer is selected from the group consisting of vinyl acetate, butyl acrylate, styrene, butadiene, methylmethacrylate, methylacrylate, chloroprene, vinyl chloride, acrylonitrile, acrylamide, ethylene, ethyl acrylate, vinyl versatate, maleic anhydride, 2-ethyl hexyl acrylate and mixtures thereof.

82. Latex produced by the process of claim 55.

83. A method for reducing coagulum during an emulsion polymerization reaction, comprising the step of adding a coagulum reducing quantity of:
(a) a surfactant composition comprising:
about 39 weight % to about 76 weight % of a fatty alcohol ethoxylate having a degree of ethoxylation of at least 14;
about 4 weight % to about 40 weight % alkylpolyglycoside; and
about 20 weight % to about 60 weight % water, wherein the weight % is of the total of the fatty alcohol ethoxylate plus alkylpolyglycoside plus water; to an emulsion polymerization composition comprising:
(b) water,
(c) an effective amount of initiator; and
(d) at least one substantially water-insoluble monomer.

84. The method of claim 83, wherein the surfactant composition comprises:
about 39 to about 67.5 weight % of a fatty alcohol ethoxylate having a degree of ethoxylation of at least 14;
about 5 to about 35 weight % alkylpolyglycoside; and
about 22 weight % to about 45 weight % water.

85. The method of claim 83, wherein the degree of ethoxylation ranges from about 20 to about 50.

86. The method of claim 83, wherein the ethoxylated fatty alcohol is substantially tallow alcohol-40-ethoxylate.

87. The method of claim 83, wherein the ethoxylated fatty alcohol is substantially lauryl alcohol-30-ethoxylate.

88. The method of claim 83, wherein the ethoxylated fatty alcohol is substantially lauryl alcohol-20-ethoxylate.

89. The method of claim 83, wherein the ethoxylated fatty alcohol is substantially lauryl alcohol-50-ethoxylate.

90. The method of claim 83, wherein the ethoxylated fatty alcohol is substantially lauryl alcohol-40-ethoxylate.

91. The method of claim 83, wherein the ethoxylated fatty alcohol is substantially tallow-20-ethoxylate.

92. The method of claim 83, wherein the ethoxylated fatty alcohol is substantially tallow-30-ethoxylate.

93. The method of claim 83, wherein the alkyl group of the alkylpolyglycoside is about $C_8$ to about $C_{10}$.

94. The method of claim 83, wherein the alkyl group of the alkylpolyglycoside is about $C_{12}$ to about $C_{16}$.

95. The method of claim 83, wherein the average glycoside residue degree of polymerization of the alkylpolyglycoside is about 1.5.

96. The method of claim 83, wherein the average glycoside residue degree of polymerization of the at least one alkylpolyglycoside is about 1.4 to about 1.8.

97. The method of claim 83, wherein the surfactant composition comprises:
    about 46 wt. % lauryl alcohol-30-ethoxylate;
    about 19 wt. % of an alkylpolyglycoside having an alkyl group with an average carbon chain of about 9 and with an average glycoside residue degree of polymerization of about 1.5; and
    about 35 wt. % water.

98. The method of claim 83, wherein the surfactant composition comprises:
    about 46 wt. % tallow alcohol-40-ethoxylate;
    about 28 wt. % of an alkylpolyglycoside having an alkyl group with an average carbon chain of about 9 and with an average glycoside residue degree of polymerization of about 1.5; and
    about 26 wt. % water.

99. The method of claim 83, wherein the surfactant composition comprises:
    about 46 wt. % lauryl alcohol-20-ethoxylate;
    about 19 wt. % of an alkylpolyglycoside having an alkyl group with an average carbon chain of about 9 and with an average glycoside residue degree of polymerization of about 1.5; and
    about 35 wt. % water.

100. The method of claim 83, wherein the surfactant composition comprises:
    about 46 wt. % lauryl alcohol-50-ethoxylate;
    about 19 wt. % of an alkylpolyglycoside having an alkyl group with an average carbon chain of about 9 and with an average glycoside residue degree of polymerization of about 1.5; and
    about 35 wt. % water.

101. The method of claim 83, wherein the surfactant composition comprises:
    about 46 wt. % lauryl alcohol-40-ethoxylate;
    about 19 wt. % of an alkylpolyglycoside having an alkyl group with an average carbon chain of about 9 and with an average glycoside residue degree of polymerization of about 1.5; and
    about 35 wt. % water.

102. The method of claim 83, wherein the surfactant composition comprises:
    about 55 wt. % lauryl alcohol-30-ethoxylate;
    about 10 wt. % of an alkylpolyglycoside having an alkyl group with an average carbon chain of about 9 and with an average glycoside residue degree of polymerization of about 1.5; and
    about 35 wt. % water.

103. The method of claim 83, wherein the surfactant composition comprises:
    about 50.2 wt. % lauryl alcohol-20-ethoxylate;
    about 16.8 wt. % of an alkylpolyglycoside having an alkyl group with an average carbon chain of about 9 and with an average glycoside residue degree of polymerization of about 1.5; and
    about 33 wt. % water.

104. The method of claim 83, wherein the surfactant composition comprises:
    about 50 wt. % lauryl alcohol-20-ethoxylate;
    about 15 wt. % of an alkylpolyglycoside having an alkyl group with an average carbon chain of about 9 and with an average glycoside residue degree of polymerization of about 1.5; and
    about 35 wt. % water.

105. The method of claim 83, wherein the surfactant composition comprises:
    about 48 wt. % lauryl alcohol-40-ethoxylate;
    about 16 wt. % of an alkylpolyglycoside having an alkyl group with an average carbon chain of about 9 and with an average glycoside residue degree of polymerization of about 1.5; and
    about 36 wt. % water.

106. The method of claim 83, wherein the surfactant composition comprises:
    about 55.5 wt. % lauryl alcohol-50-ethoxylate;
    about 18.5 wt. % of an alkylpolyglycoside having an alkyl group with an average carbon chain of about 9 and with an average glycoside residue degree of polymerization of about 1.5; and
    about 26 wt. % water.

107. The method of claim 83, wherein the surfactant composition comprises:
    about 50 wt. % lauryl alcohol-30-ethoxylate;
    about 15 wt. % of an alkylpolyglycoside having an alkyl group with an average carbon chain of about 9 and with an average glycoside residue degree of polymerization of about 1.5; and
    about 35 wt. % water.

108. The method of claim 83, wherein the surfactant composition comprises:
    about 38 wt. % tallow alcohol-40-ethoxylate;
    about 34 wt. % of an alkylpolyglycoside having an alkyl group with an average carbon chain of about 9 and with an average glycoside residue degree of polymerization of about 1.5; and
    about 28 wt. % water.

109. The method of claim 83, wherein the water-insoluble monomer is selected from the group consisting of vinyl acetate, butyl acrylate, styrene, butadiene, methylmethacrylate, methylacrylate, chloroprene, vinyl chloride, acrylonitrile, acrylamide, ethylene, ethyl acrylate, vinyl versatate, maleic anhydride, 2-ethyl hexyl acrylate and mixtures thereof.

110. Latex produced by the method of claim 83.

111. Latex produced by the method of claim 83, wherein said latex contains less than about 1 wt. % coagulum based on monomer.

112. Latex produced by the method of claim 83, wherein said latex is all acrylic or styrene acrylic and said latex contains less than about 3 wt. % alkylpolyglycoside and fatty alcohol ethoxylate based on monomer.

113. Latex produced by the method of claim 83, wherein said latex is vinyl acrylic and said latex contains less than about 1.5 wt. % alkylpolyglycoside and fatty alcohol ethoxylate based on monomer.

* * * * *